Figure 1:
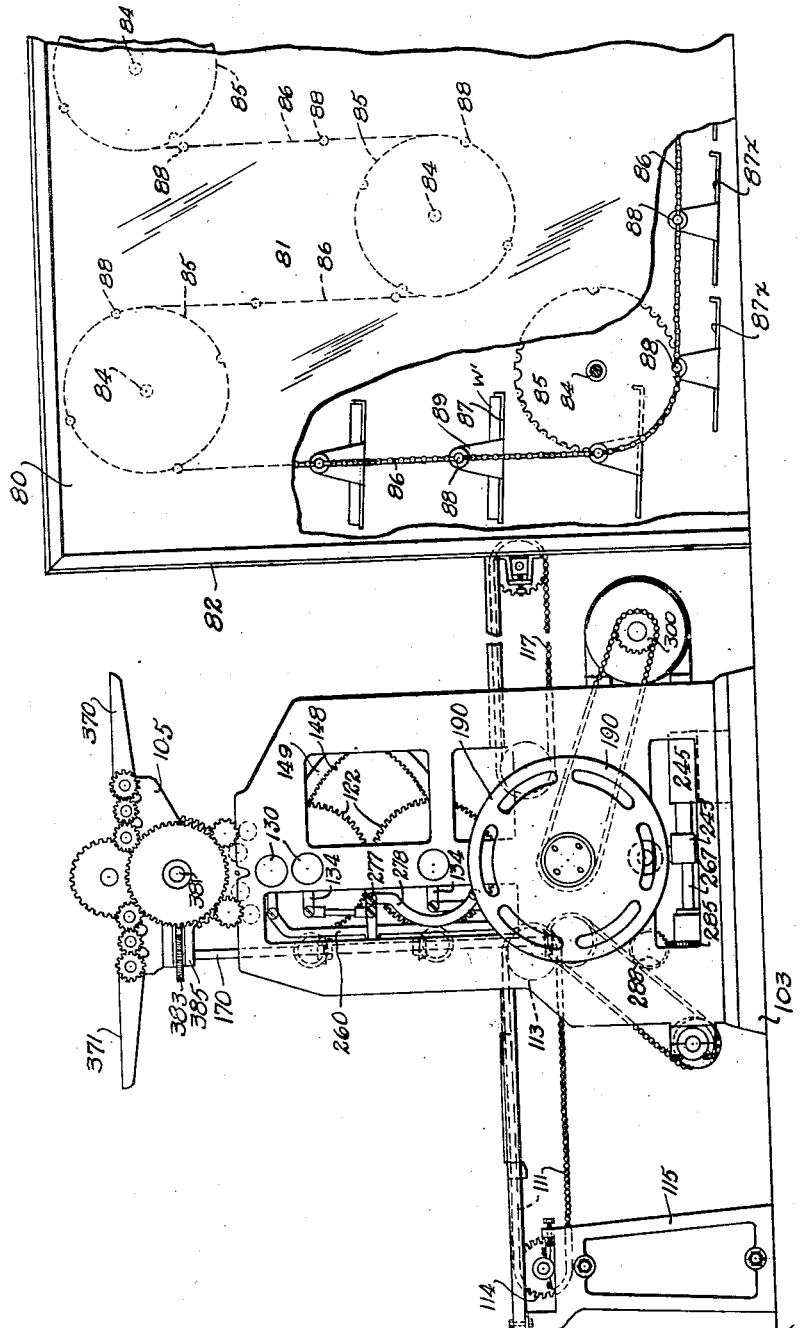

July 10, 1934.  A. PEARSON ET AL  1,966,311
SURFACE DECORATING MECHANISM
Filed June 11, 1931   20 Sheets-Sheet 1

Inventors
Arvid Pearson,
Joseph D. Kris
By Macklin, Soule & Leonard
Attorneys

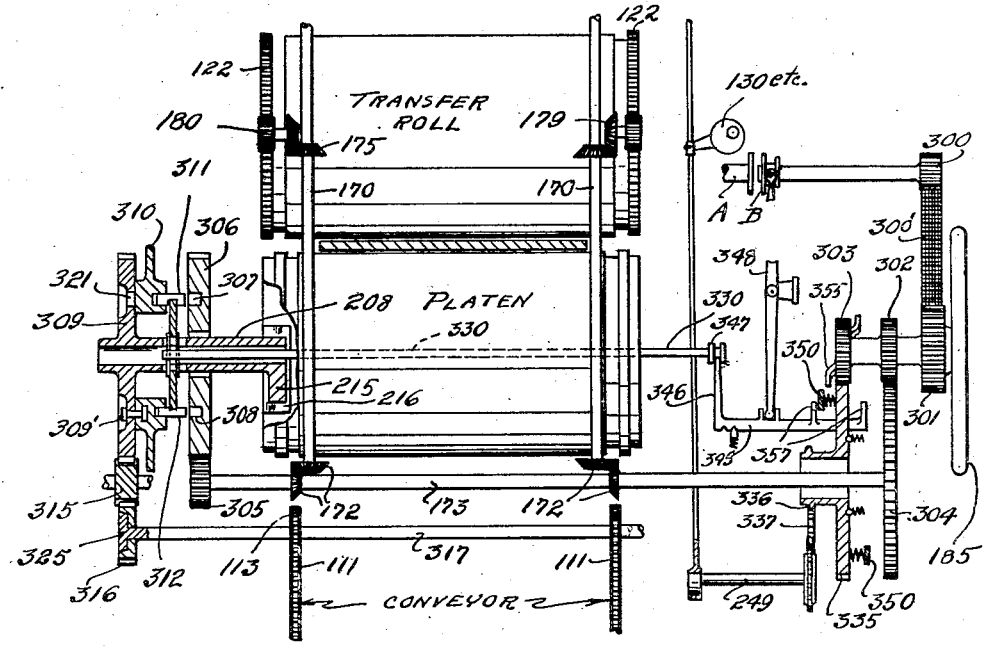
Fig.-8 (DIAGRAM)
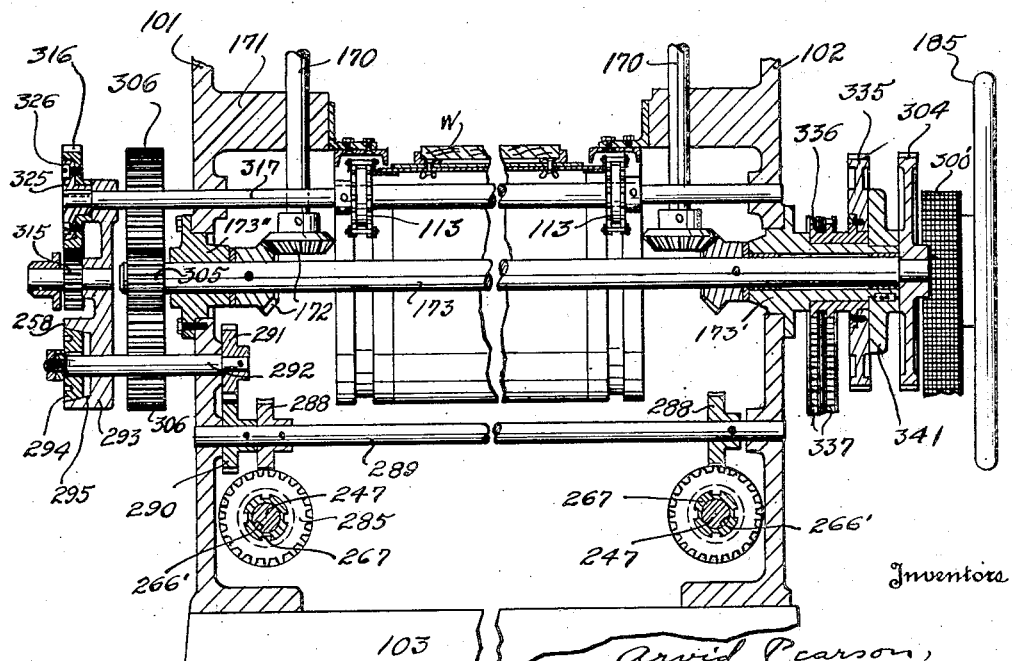
Fig.-7

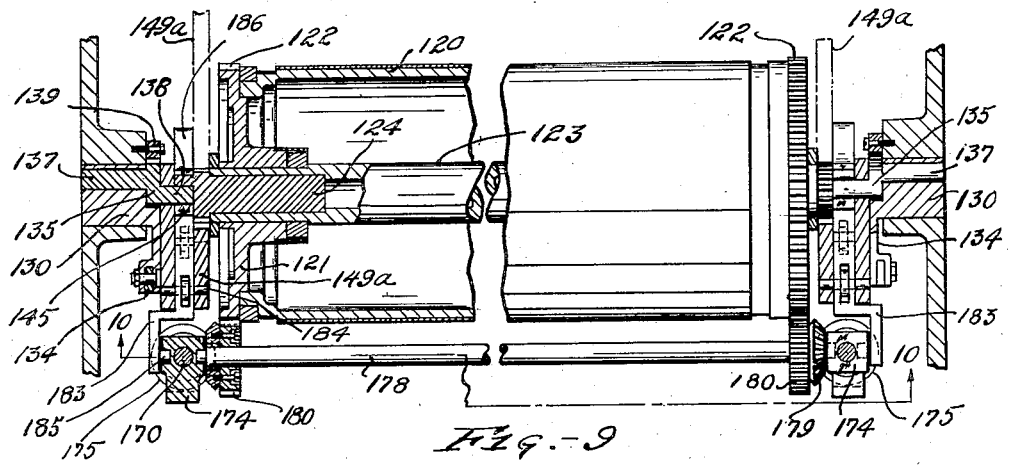

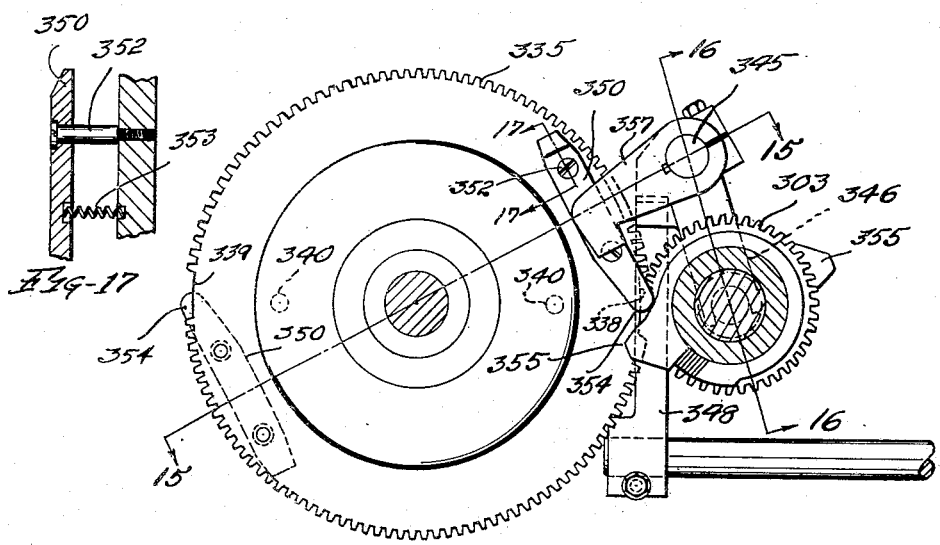
Fig-17
Fig-14
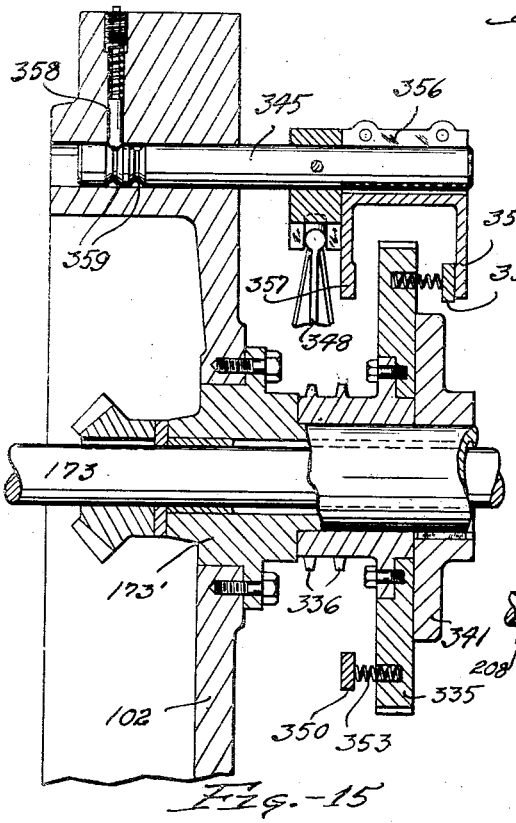
Fig-15
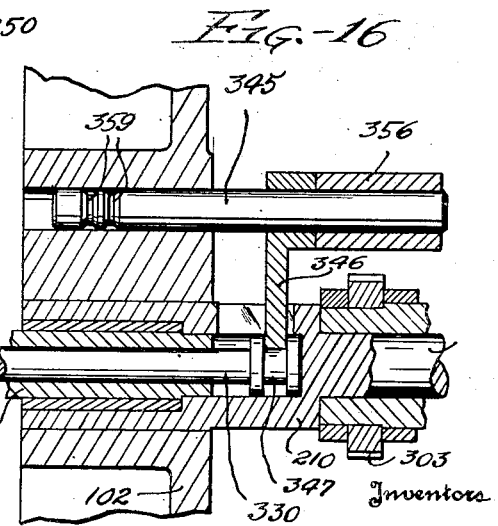
Fig-16
Inventors
Arvid Pearson,
Joseph D. Kris
By Macklin, Soule & Leonard
Attorneys

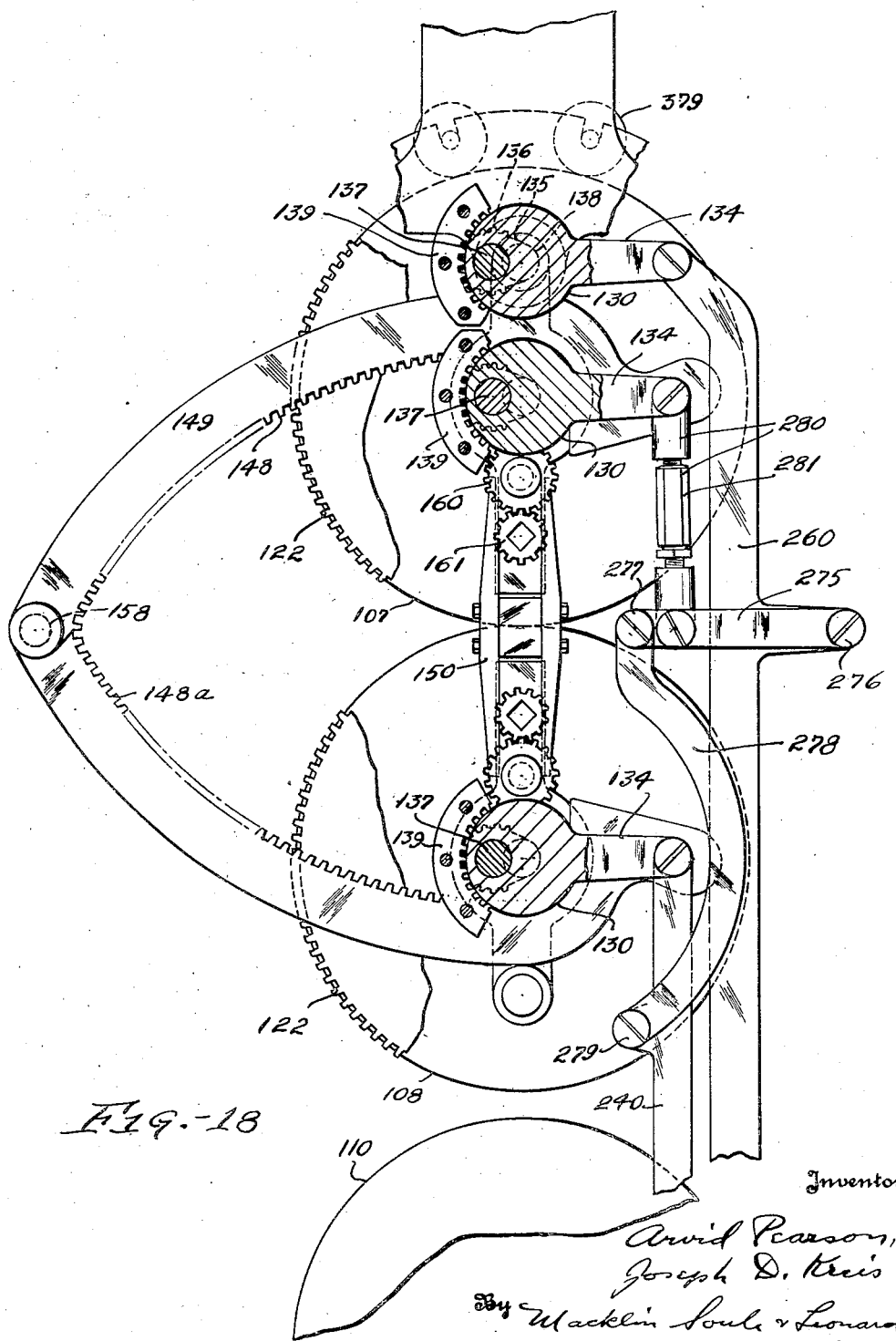

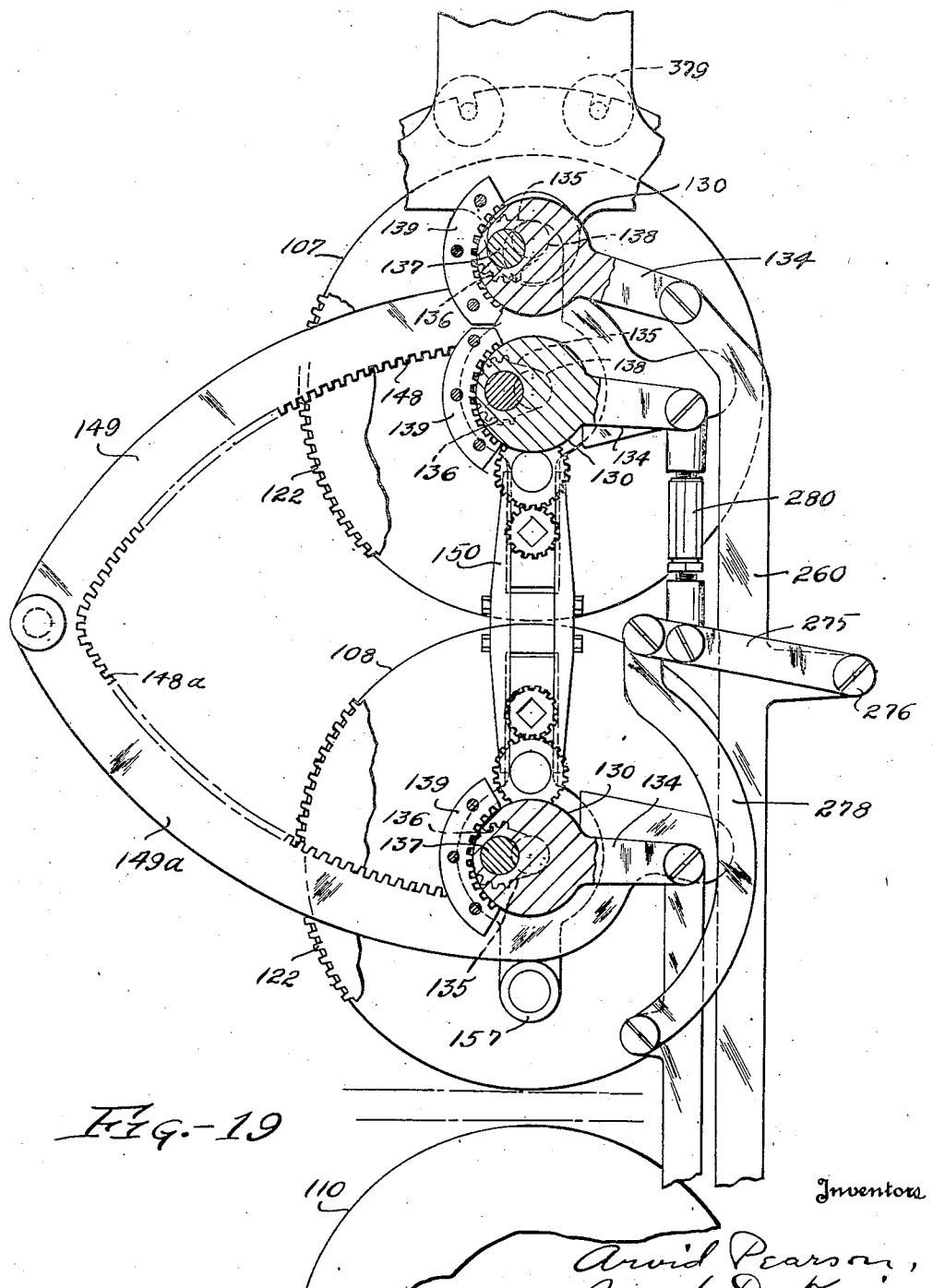

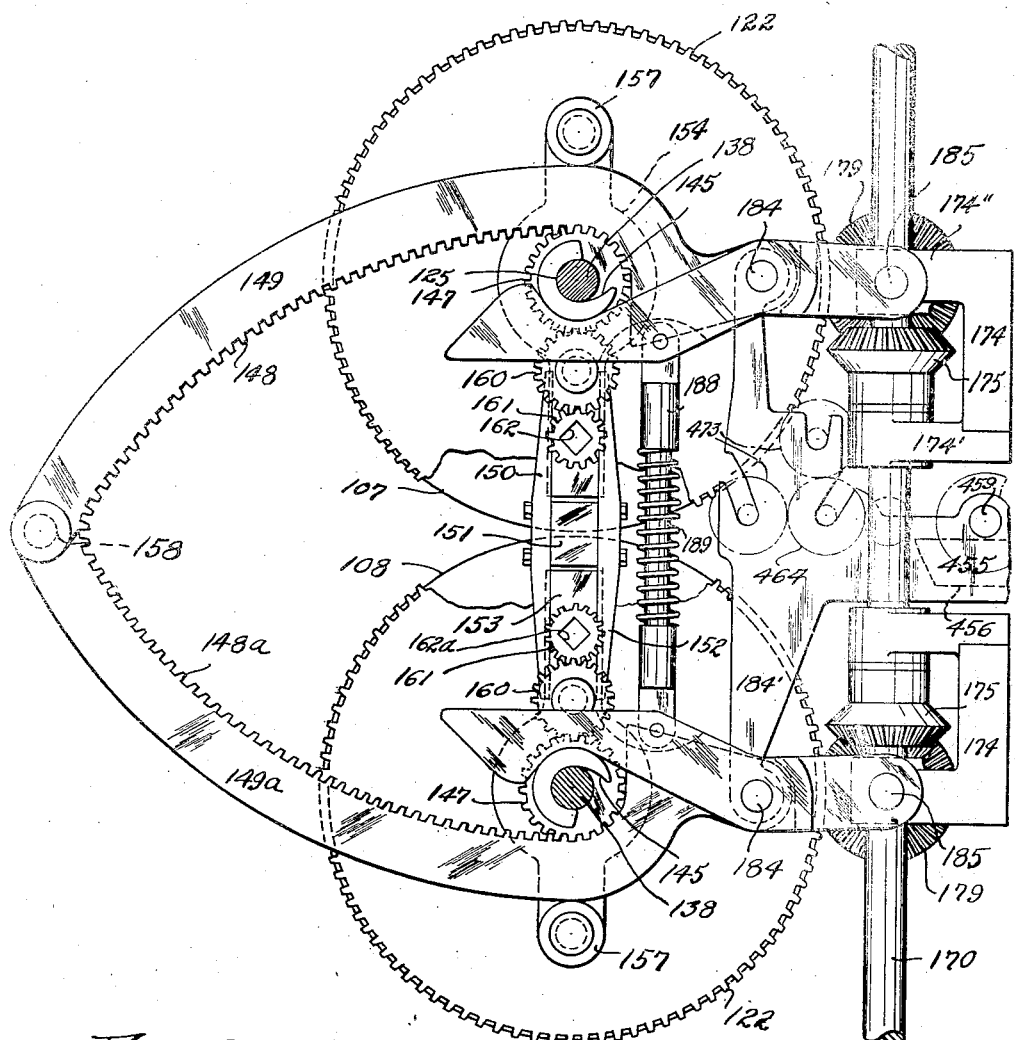

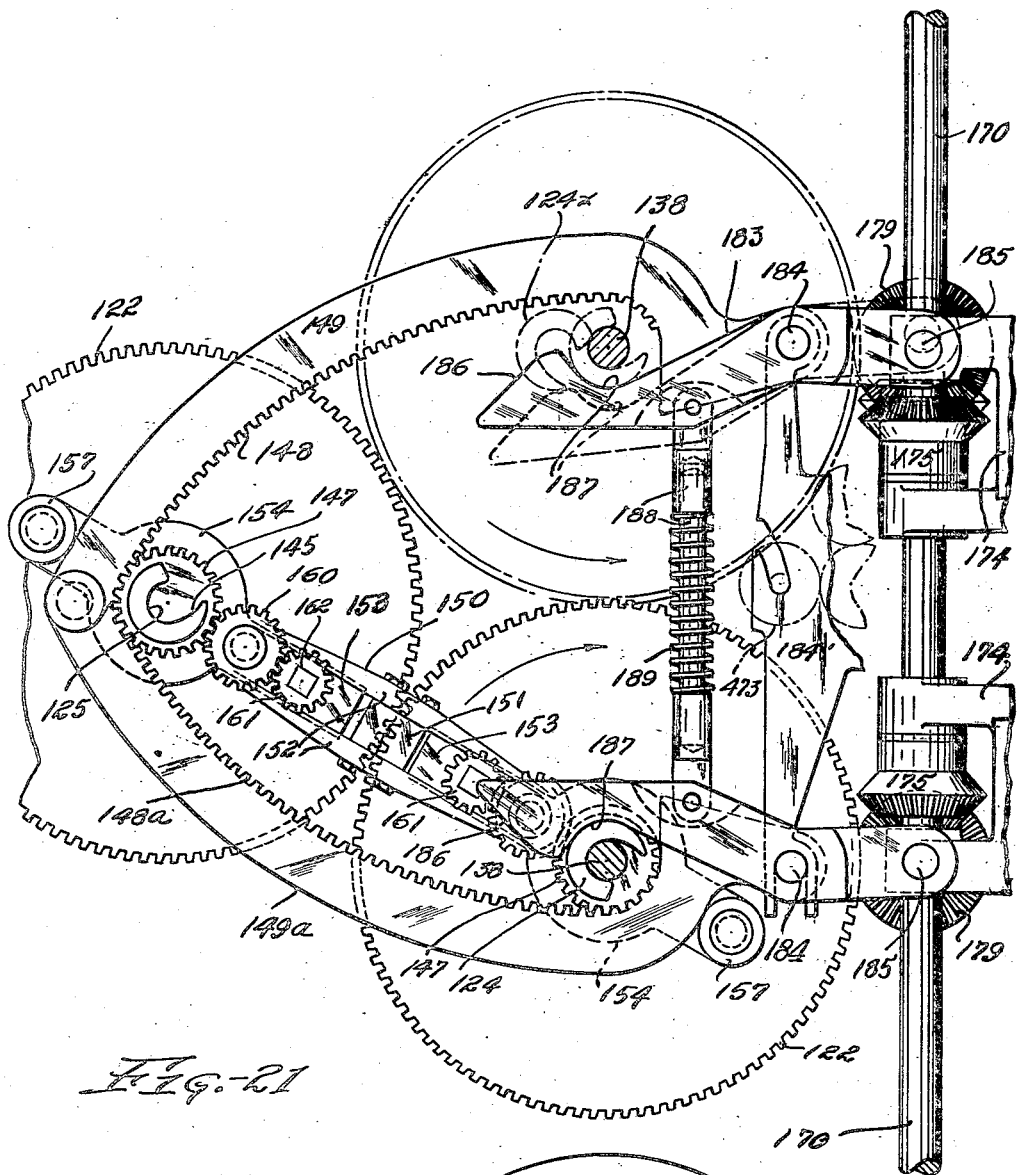

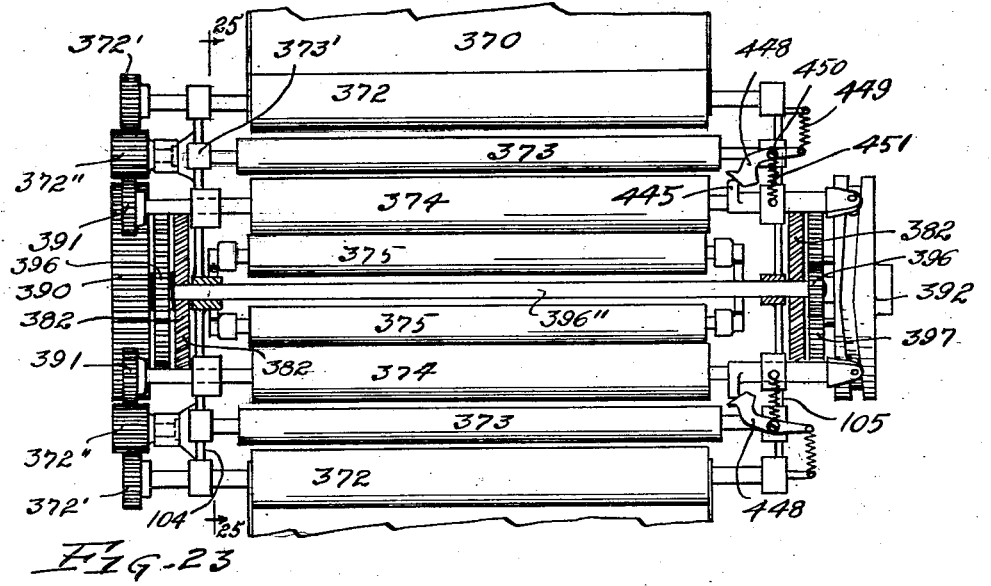
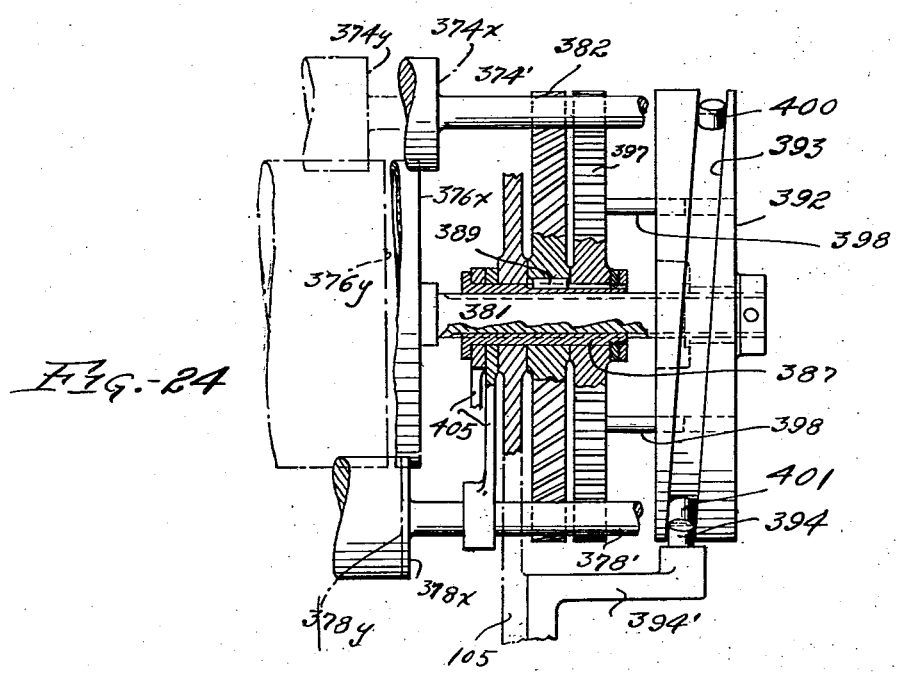

July 10, 1934.  A. PEARSON ET AL  1,966,311
SURFACE DECORATING MECHANISM
Filed June 11, 1931  20 Sheets-Sheet 17

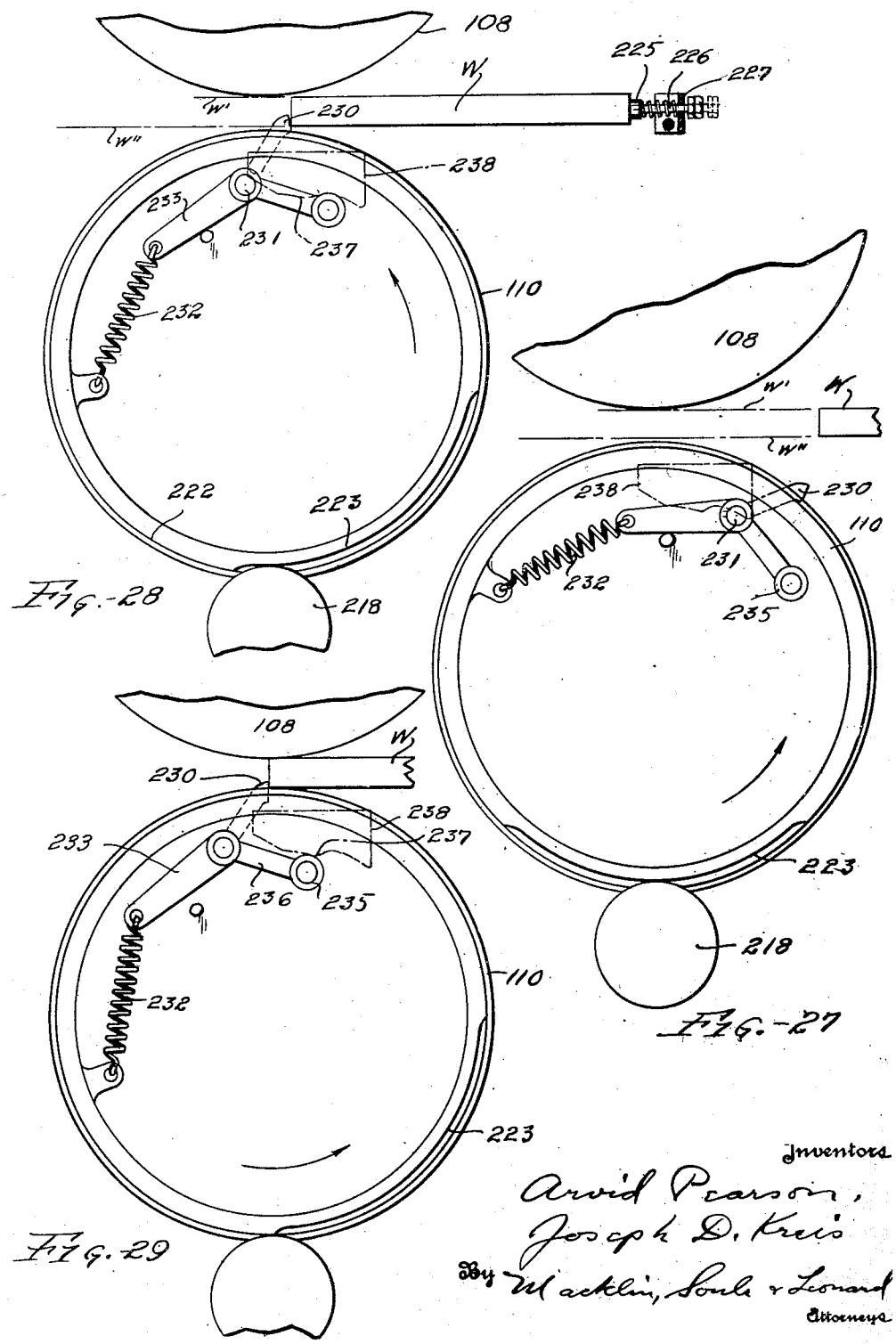

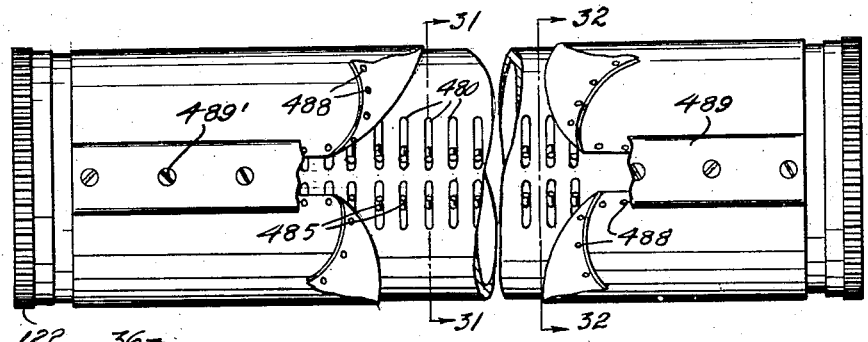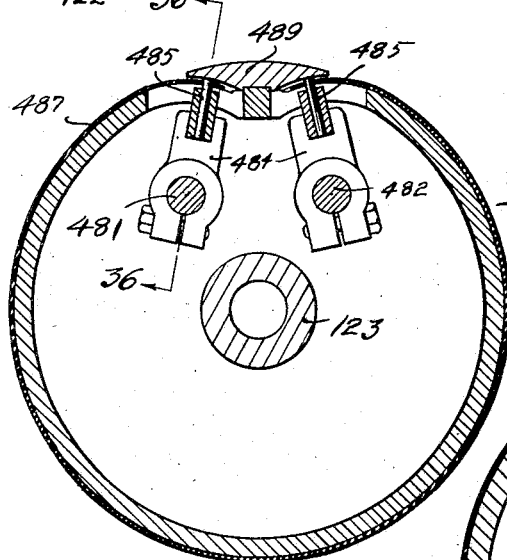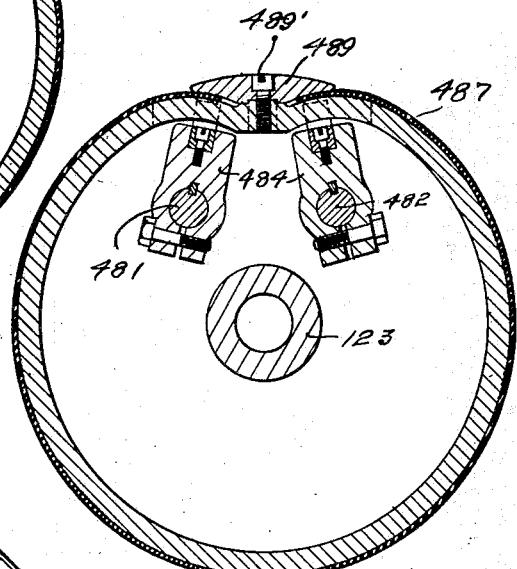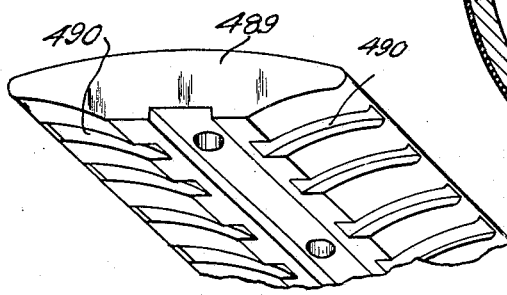

July 10, 1934.  A. PEARSON ET AL  1,966,311
SURFACE DECORATING MECHANISM
Filed June 11, 1931  20 Sheets-Sheet 20
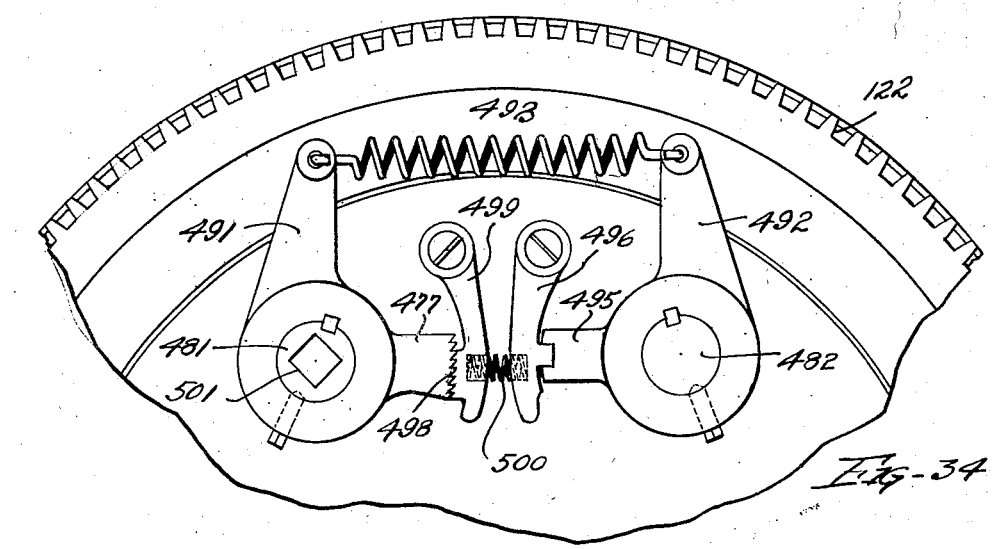
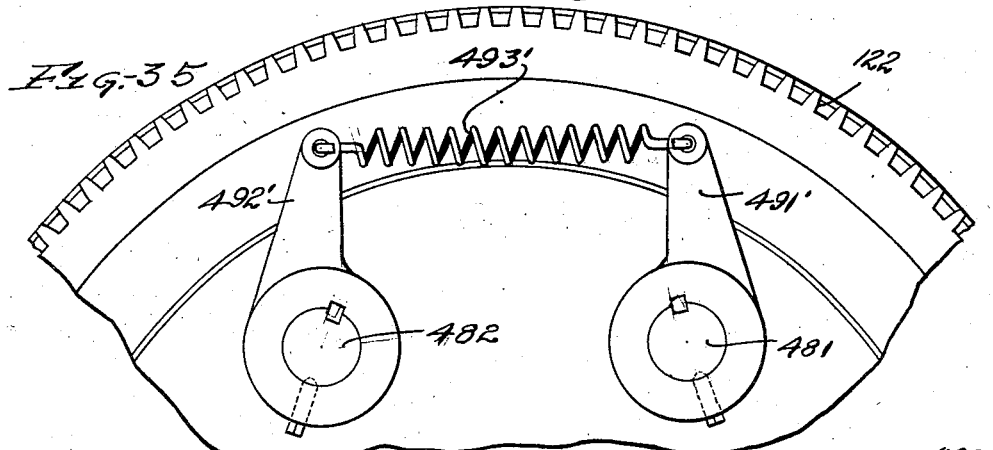
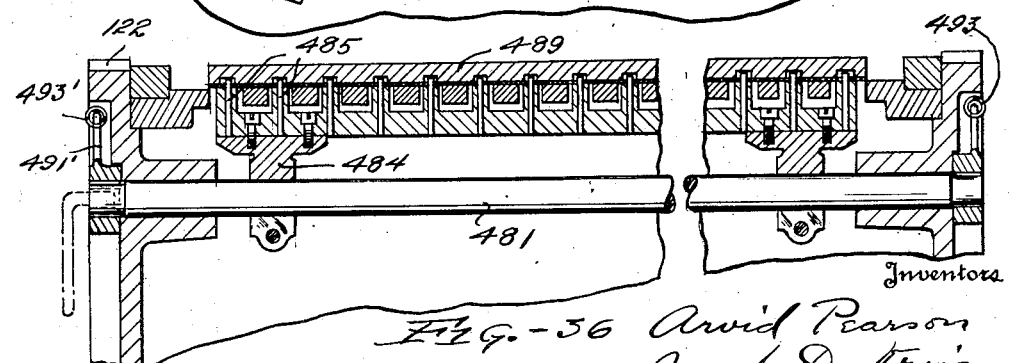

Patented July 10, 1934

1,966,311

UNITED STATES PATENT OFFICE 1,966,311

SURFACE DECORATING MECHANISM

Arvid Pearson and Joseph D. Kreis, Cleveland, Ohio; said Kreis assignor to said Pearson Application June 11, 1931, Serial No. 543,546

29 Claims. (Cl. 101—144)

Heretofore, printing in simulation or reproduction of natural patterns, such as wood grain, marble, stone and the like, has been tedious and very costly. The present invention aims generally to improve this situation. The more important phases of the improvement will be apparent from the statement of objects given below. The objects include the provision of the following:

1. A high speed graining machine.

2. A work decorating process and mechanism by which work of any thickness within predetermined limits may be effectively decorated at high speed.

3. A graining machine by which various materials may be decorated uniformly in faithful representation of the design and true color effects of the subject to be reproduced.

4. A graining machine in which successive design imprints are made in absolute registration relationship.

5. A graining machine in which work blanks varying from paper thickness up to a few inches may be decorated in a variety of colors, preserving absolute registration of the different color imprints.

6. A graining machine of the offset printing type in which the offset element does not have to be cleaned after successive graining imprints.

7. An improved planagraphic printing press.

8. An improved work feeding and registering apparatus for rolling contact printing.

9. A printing machine wherein work blanks may be accurately printed from any desired portion of the design on the pattern or plate.

10. Feeding and registering mechanism for a printing machine by which registering devices on a platen are easily adjusted and automatically maintained in proper relationship to feeding devices on a conveyer, for aligning and properly printing different length blanks.

11. A machine in which printing pressure is brought to bear on the work when and only when the work is in proper position for printing.

12. A rotary printing machine in which printing on blanks varying greatly in thickness may be accomplished and the printing and inking elements separated the desired uniform distances in any setting of the machine with respect to thickness of blanks.

13. A rotary offset printing machine wherein the offset roll and platen and the pattern roll and inking mechanism are relatively separated as a single operation.

14. A novel arrangement for controlling the rotary elements of a printing machine to cause mutual separation thereof with no possibility of smudging.

15. Specifically, an eccentric adjustment for rotary printing members which will be capable of moving the members into and out of operative contact by movements in planes coincident with the axes of both members separated.

16. An improved arrangement in a printing machine for facilitating removal and replacement of flexible printing members, such as sheet metal printing plates and resilient offset or transfer blankets.

Other objects will become apparent from the following description relating to the accompanying drawings. The drawings show the preferred embodiments.

Figure 2:
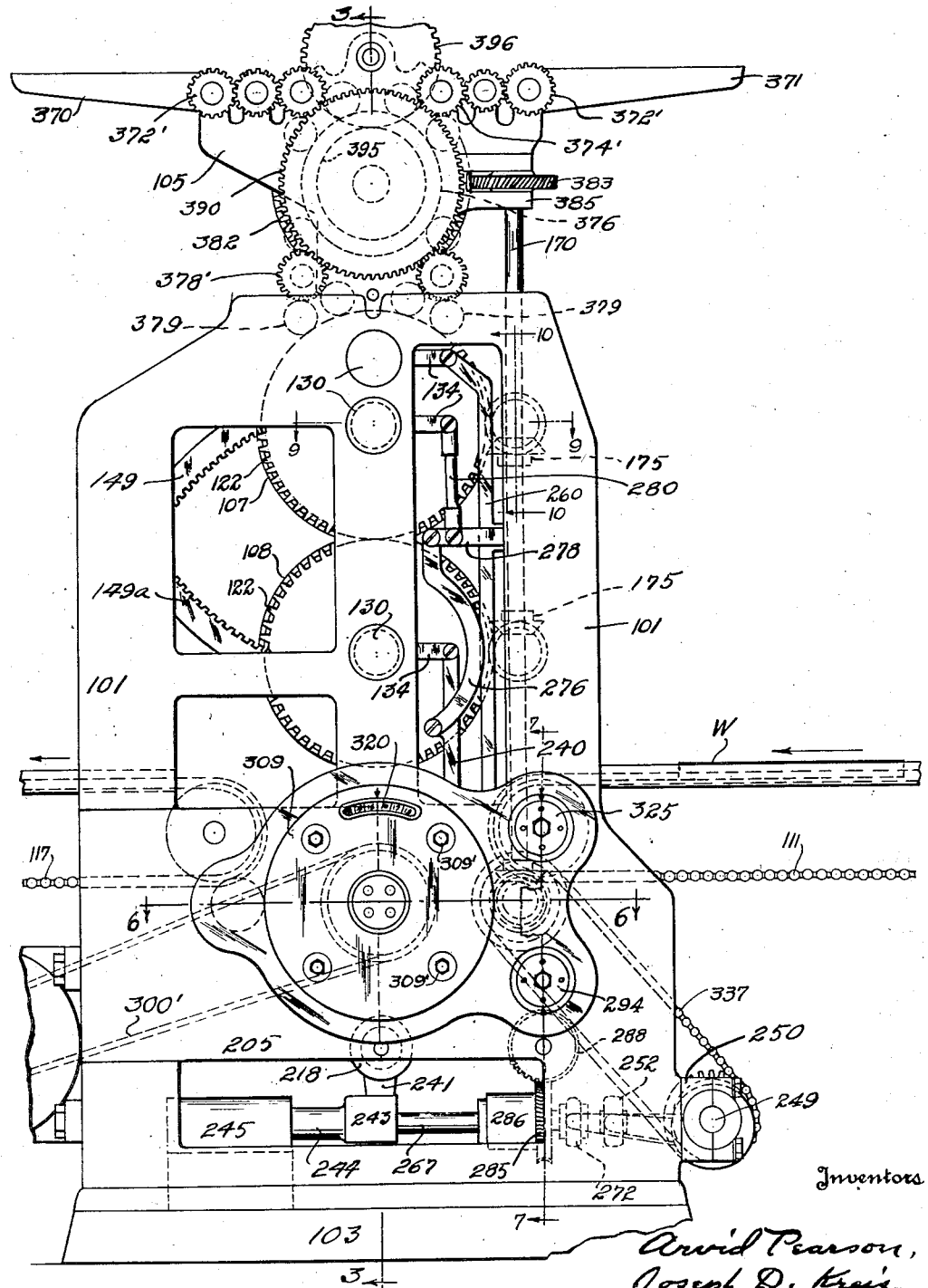
Figure 3:
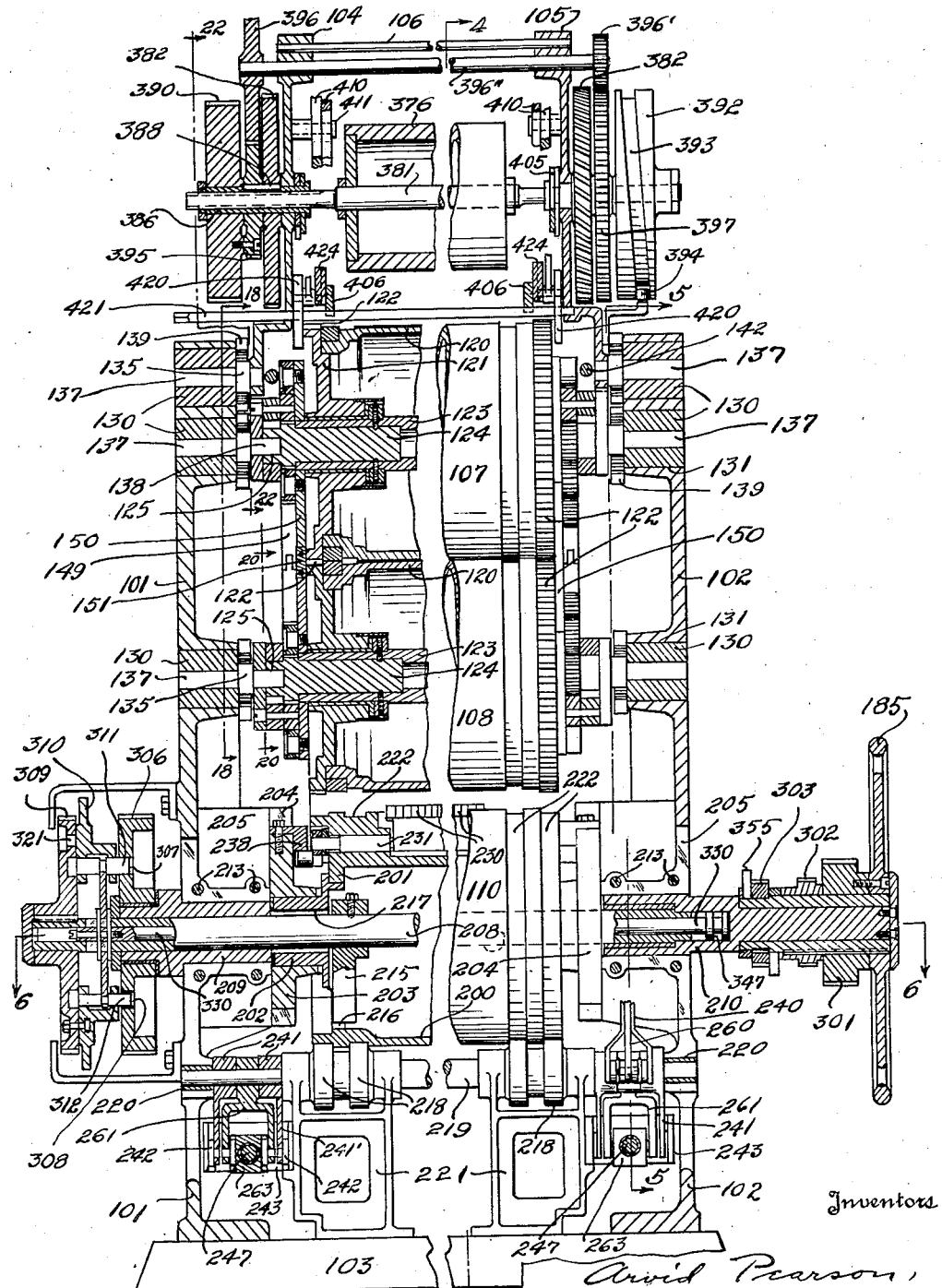
Figure 4:
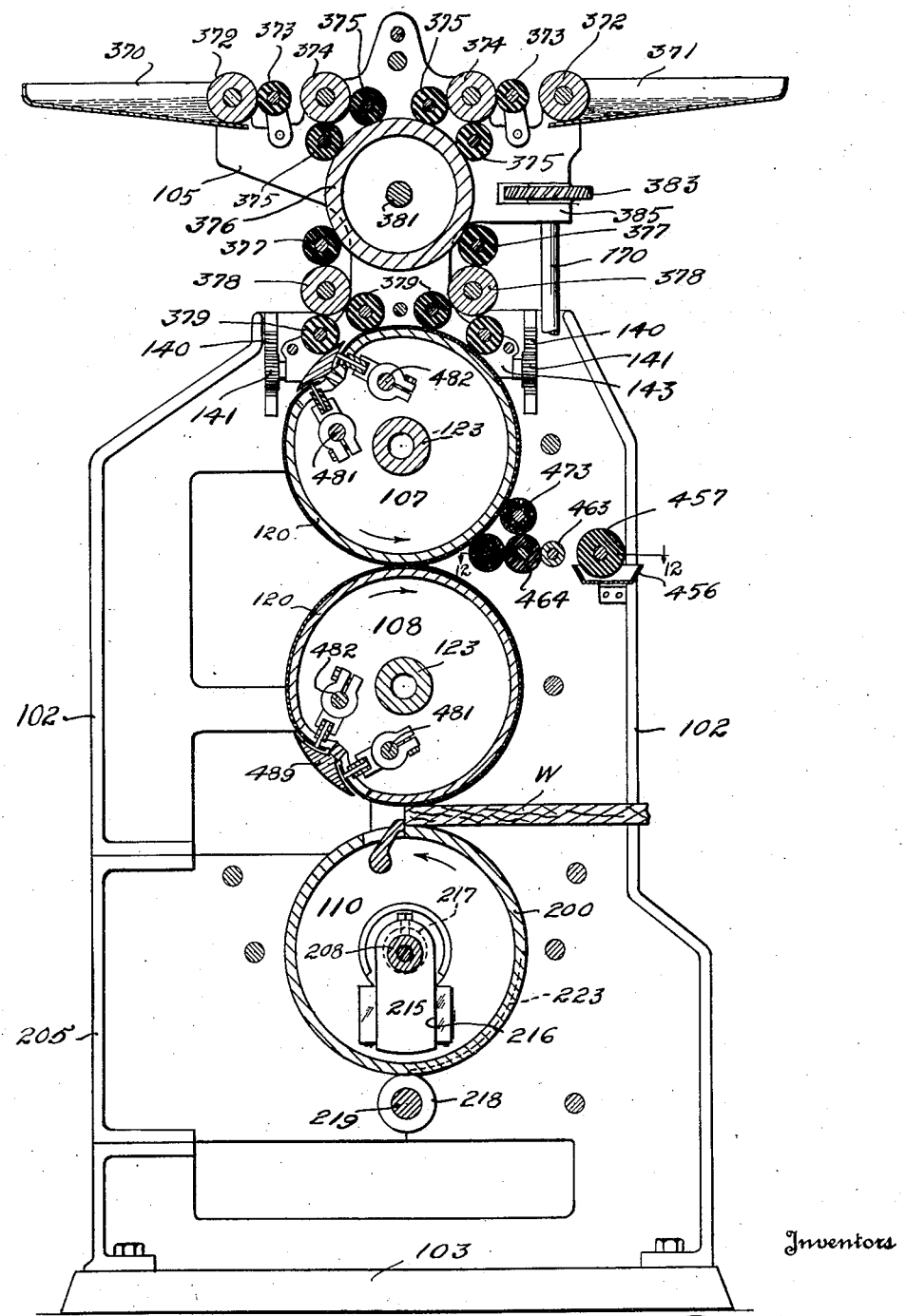
Figure 5:
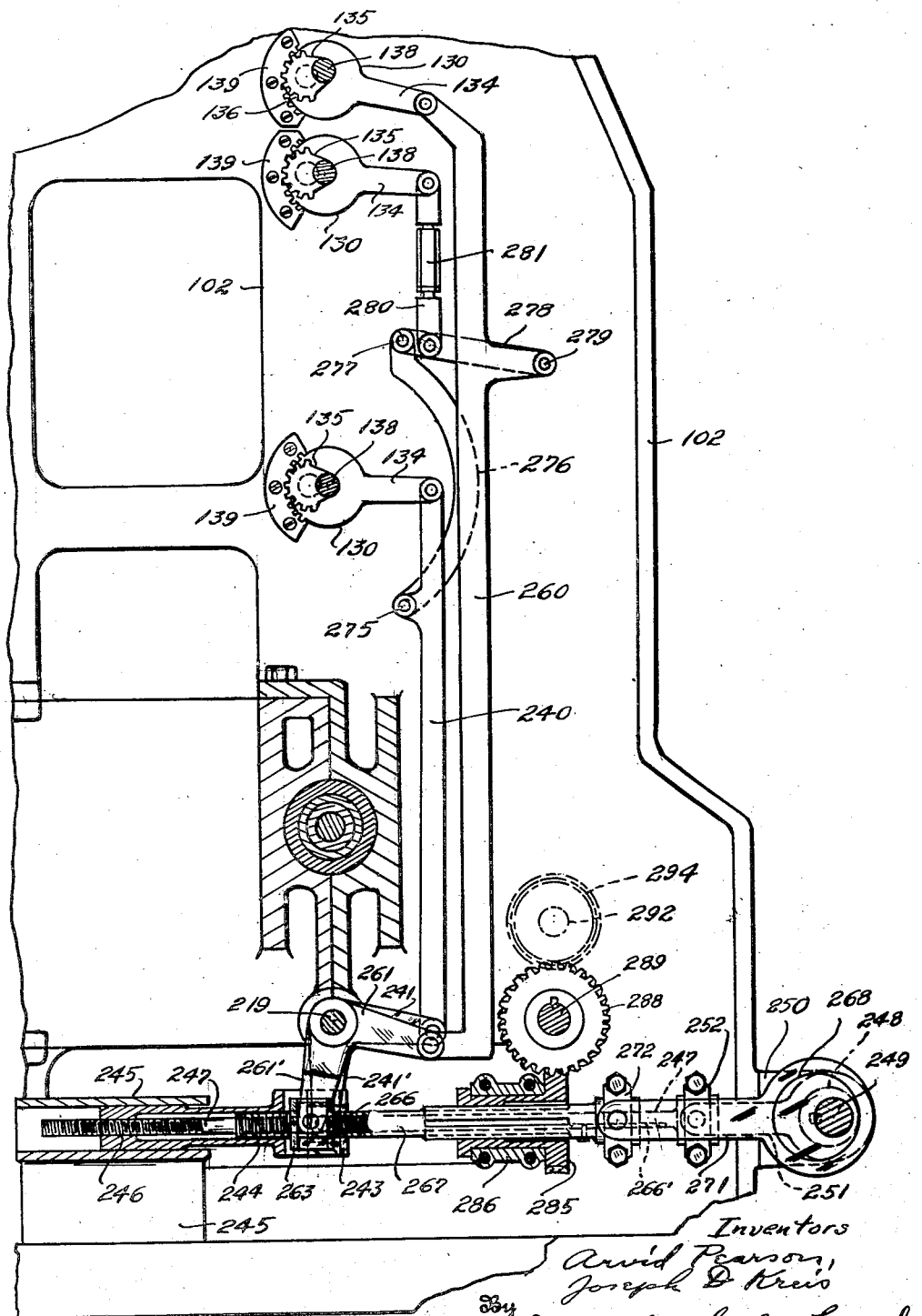
Figure 6:
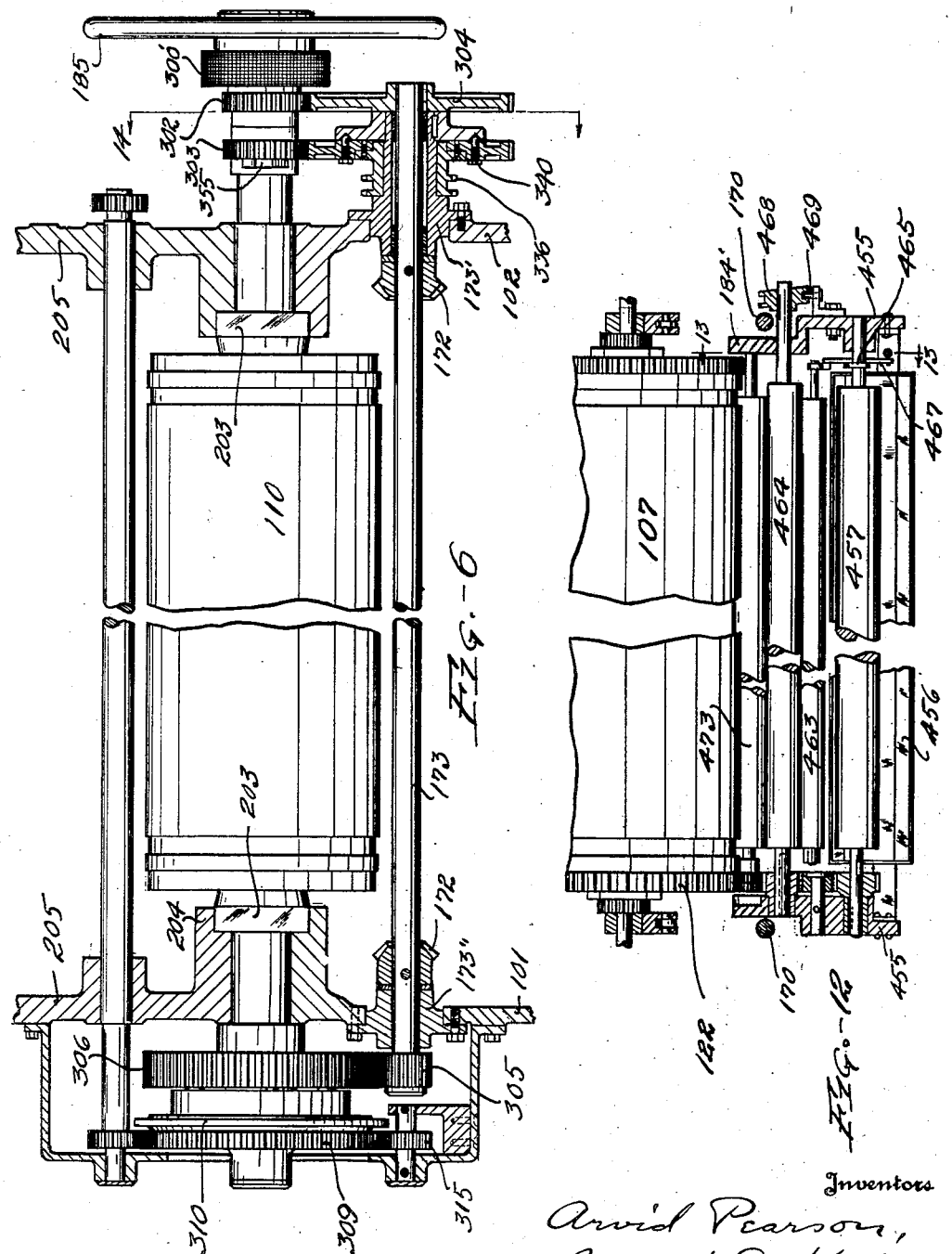
Figure 22:
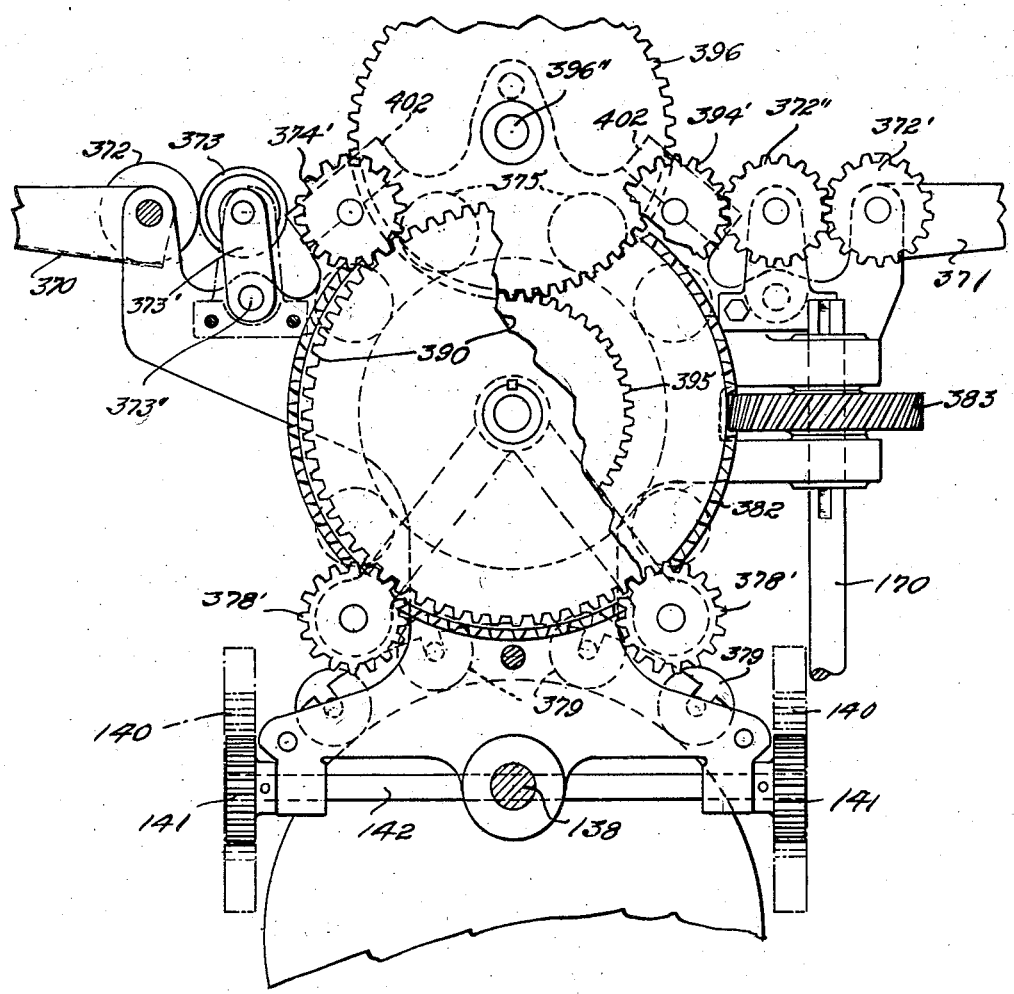
Figure 25:
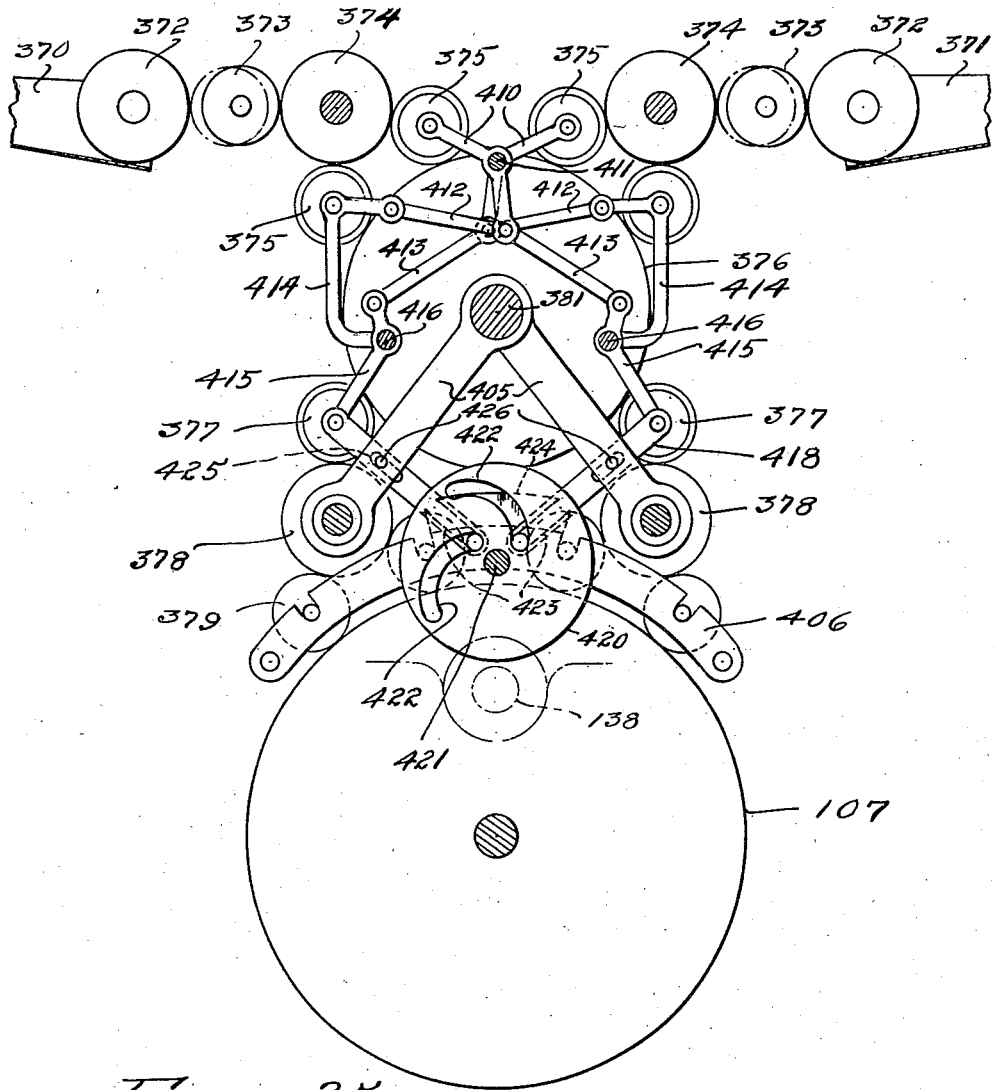
Figure 26:
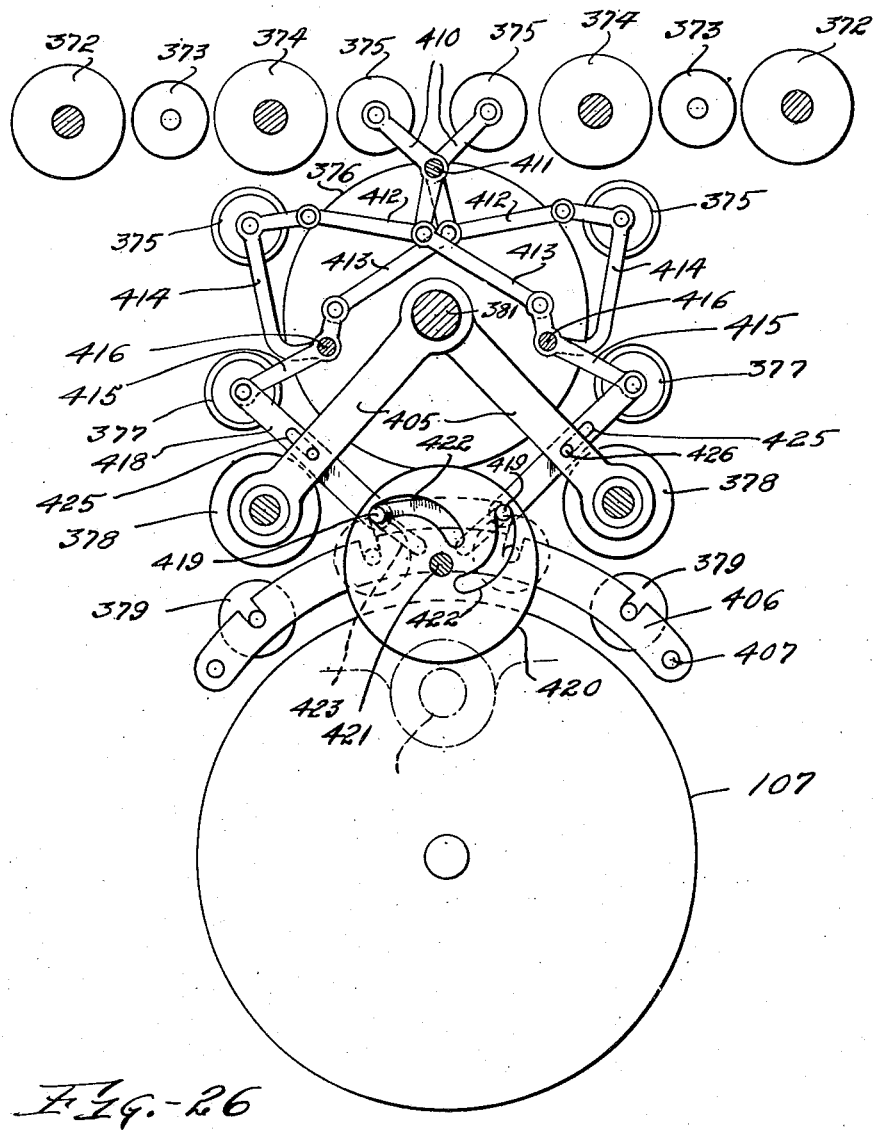

In the drawings, Fig. 1 is a somewhat diagrammatic view showing, in side elevation, one form of work decorating machine, and feeding and delivery conveyer arrangements therefor, including a drying unit for the decorated work; Fig. 2 is a side elevation showing the opposite side of the machine; Fig. 3 is a sectional view of the machine taken substantially along the line 3—3 on Fig. 2; Fig. 4 is a sectional view taken substantially along the line 4—4 on Fig. 3 and showing the relative position of all the rolls in the machine when in operation; Fig. 5 is a sectional view taken substantially along the line 5—5 on Fig. 3 and showing the mechanism for raising and lowering the various rolls and the inking mechanism; Fig. 6 is a sectional plan view taken substantially along the line 6—6 on Fig. 2; Fig. 7 is a sectional view taken substantially along the line 7—7 on Fig. 2 and showing particularly the conveyer drive and other details of the driving mechanism; Fig. 8 is a driving mechanism diagram; Fig. 9 is a sectional plan view taken substantially along the line 9—9 on Fig. 2; Fig. 10 is a sectional view at right angles to Fig. 9 taken substantially along the lines 10—10 on Figs. 2 and 9; Fig. 11 is a detail view showing a portion of the roll-driving mechanism; Figs. 12 and 13 are corresponding views of a suitable dampening mechanism for the pattern roll, Fig. 12 being a sectional plan taken substantially along the line 12—12 on Fig. 4; Fig. 14 is a sectional view as indicated on Fig. 6, showing portions of the driving mechanism, particularly the timing devices for raising and lowering the various rolls in proper order and rendering the platen and conveyer drive effective at the proper time; Figs. 15, 16 and 17 are sectional views as indicated on Fig. 14; Figs. 18 and 19 are diagrammatic sectional views showing the pattern and transfer roll and inking mechanism raising and lowering devices, these two views showing the parts in respectively different positions and being in the nature of sectional side elevations of the parts shown, taken substantially along the line 18—18 on Fig. 3; Figs. 20 and 21 are side elevational end views of the mounting arrangements for the pattern and transfer rolls, these views being taken substantially along the line 20—20 on Fig. 3; Fig. 22 is a fragmentary side elevation of the inking mechanism frame, and driving gearing; Fig. 23 is a plan view of the inking mechanism; Fig. 24 is a diagram showing certain details of the distributor roll reciprocating mechanism; Figs. 25 and 26 are diagrams in the nature of sections taken along the line 25—25 on Fig. 23, these two views illustrating the relationship of the inking rolls in operative and inoperative positions respectively; Figs. 27, 28 and 29 are diagrammatic views showing the manner in which work is fed to printing position, aligned preparatory to being printed and then printed; Fig. 30 is a plan view of the transfer roll (or pattern roll) illustrating the manner in which the transfer blanket (or the pattern plate) is attached to the roll; Figs. 31 and 32 are transverse cross sectional views through the roll, indicated by corresponding section lines on Fig. 30; Fig. 33 is a perspective detail of the preferred securing device for the blanket material; Figs. 34 and 35 are opposite fragmentary end views of the roll shown in Fig. 30, and Fig. 36 is a sectional detail taken through a portion of the plate tension means substantially along the line 36—36 on Fig. 31.

It should be stated at the outset that the present machine is part of a new graining system which we have devised, including a novel process and apparatus for making graining and other printing plates, shown and separately claimed in application Ser. No. 543,547 filed June 11, 1931. Plates made according to said application are planographic and to use such plates, the present machine may have both dampening and inking mechanism adapted to first moisten and then ink the plate on the pattern roll. The plate then rolls into contact with a suitable transfer member, such as a rubber blanket, which in turn carries the design to the work which is fed and properly supported, as will be clearly described.

Referring now to Figs. 1 to 36, the major parts of the power-driven graining machine shown are as follows: Suitable side frame members 101 and 102 are provided, suitably secured together by cross members and mounted on a heavy base or bed 103. Near the top of the side frame members is a superstructure frame, including side frame members 104 and 105 (essentially alike) and suitable cross frame bracing members for these. This superstructure frame carries inking mechanism, which will be later described in detail, and which is movably mounted to be raised and lowered with reference to the main frame in order to separate the inking rolls as a unit from the main pattern element of the machine.

The main pattern element comprises a plate supporting roll 107, directly below which is a transfer roll 108, arranged to periodically contact with the pattern on the pattern roll and to receive an ink impression therefrom corresponding to the pattern. Below the transfer roll is a platen or work supporting roll 110. Work is carried to between the transfer roll and the platen by a conveyer arrangement, including work driving chains 111 equipped with blank feeding projections; the chains being supported on suitable sprockets 113 and 114. The sprockets 114 are carried on a separate frame 115 adjacent the receiving side of the machine. There is also a delivery conveyer, including chains 117, the supports and driving arrangement for which may be in substantial accordance with the supports and driving arrangements for feeding conveyer mechanism, which will be hereinafter described in detail.

The mountings for the pattern roll and transfer roll are essentially similar and provide for movement vertically in the machine to separate the pattern and transfer rolls, and also the pattern roll and inking mechanism; the necessary movements being predetermined in period and distance, and being uniform for various settings of the machine to accommodate work the thickness of which may vary from that of paper to heavy boards, metal panels, building material, etc. It will be shown that the roll separation is accomplished by movement of the rolls in planes coincident with their axes, thus insuring that upon separation of the roll elements there will be no smudging. It will also be shown that the pattern roll and transfer roll are mounted in such manner that these rolls may be individually removed from their normal operating position in the machine to positions exposing practically all of their working surfaces for service, cleaning, plate or blanket changing, inspection, etc. We will now described in detail the mounting arrangement for the pattern roll and transfer roll.

Referring to Figs. 3 and 4, each roll, as shown, comprises a hollow central body or shell 120 which is depressed at one side to provide for plate or blanket attachment. At this point, it may be noted that in the event of printing from a continuous pattern, the depression is omitted and the pattern is supported on the outer surface of the body of the roll, as previously noted. The hollow body 120 is supported by disc-like end plates 121, each carrying driving gear teeth 122. Suitable hub formations on the discs 121 embrace and are secured to a shaft assembly, including a tube 123 and insert stub shaft members 124. These stub shaft members are each apertured at one end, as at 125, to receive adjustable supporting pins of eccentric adjusting devices, which will now be described.

The machine has three sets of the eccentric adjusting devices; one for raising and lowering the inking mechanism, one for raising and lowering the pattern roll and one for raising and lowering the transfer roll. As shown in Figs. 2 and 3, there are six eccentric barrels, identical in formation, all numbered 130. These are mounted in suitable cylindrical apertures 131 in the respective side frame members. Each eccentric barrel has an arm 134 and these arms are preferably of equal length and are pivotally connected to suitable operating linkage by which the desired movements of the rolls and inking mechanism up and down as required, is effected.

Eccentrically journalled in the barrels, as best shown in Figs. 9, 18 and 19, are cranks 135 with gear sector teeth at 136 and relatively eccentric crank pins 137 and 138. The pins 137 are also eccentric to the barrels 130 and in one relative position of the arms 134, the pins 138 are concentric with the barrels (see Fig. 18) while in all other positions of these arms, the pins 138 are eccentric to the respective barrels (see Fig. 19). The sector teeth 136 are in constant mesh with stationary arcuate racks 139, the teeth of which are generated on arcs concentric with the barrel members 130. The result of moving the arms 134 up and down is to raise and lower the relatively eccentric crank pins 137 in arcs described about the centers of the barrels 130. The inner pins 138 which are connected to the roll supports and inking mechanism frame are raised and lowered directly vertically by reason of the planetary action of the sector devices 135 on the racks 139, and it is clear from Figs. 18 and 19 that as any one of the crank pins 137 moves upwardly and clockwise, as shown, due to clockwise movement of the respective arm 134, the corresponding crank pin 138 will also move upwardly, but counter-clockwise about the axis of the corresponding pin 137. These clockwise and counter-clockwise movements compensate each other; hence, the resultant movement of the pins 138 to move the respective rolls or inking mechanism is absolutely vertical (straight line movement), and this is notwithstanding the amount of throw of the arms 134, although the vertical distances traversed by the pins 138 will be governed according to the amount of throw of the arms.

The whole inking mechanism frame, by reason of the crank pins 138 of the uppermost sector crank devices engaging openings in the superstructure frame members 104 and 105, moves the inking mechanism frame vertically, and this frame may be guided for true vertical movement by four racks 140 and cooperating pinions 141, the latter being in pairs and rigidly connected to respective cross shafts 142 journalled in suitable ears 143 on the respective superstructure frame members 104 and 105 (see Fig. 4). This rack and pinion support for the inking mechanism reduces friction to considerable extent whereby raising and lowering the inking mechanism does not require considerable power.

The connections between both the pattern roll and the transfer roll and the cranks 135 is such that both rolls may be disconnected from the crank pins 138 in order to allow these rolls to be shifted out of their operating position into positions exposing their working surfaces. The arrangement for this will now be described.

It will be noted in Figs. 9, 20 and 21 that the openings 125 of the stub shaft 124, on which the rolls are journalled for free turning movement are spirally cut away at 145. It will be further noted that these stub shafts 124 adjacent the cut-away portions of the openings 125 which receive the eccentric crank pins 138 are provided with spur gear teeth at 147. The gear teeth of the pattern roll stub shaft 124 mesh with underhanging teeth 148 on the rack 149 and the gear teeth 147 of the stub shaft for the transfer roll overhang and mesh with identically formed teeth 148a on a rack 149a. Except that in one case, the rack overhangs the gear teeth and in the other the rack underhangs the gear teeth, the rack and gear arrangements are identical.

As an extensible connection between the supporting shafting of the two rolls, there are provided struts, one at each side of the machine at 150. These struts comprise slideways formed by central blocks 151 and grooved parallel members 152, one at each side of each block and secured thereto. Slidably supported in the grooves are brackets 153, each of which is enlarged as at 154 to provide openings at 155 in which are journalled the extreme end portions of the hollow roll supporting shafts 123.

The sliding brackets 153 carry at their respective outer extremities, rollers 157 which ride on the outer edges of the racks 149 and it may be here noted that the two racks are pivotally attached to each other, by any suitable pin arrangement, at 158, and the racks are generated on arcs slightly eccentric to the roll axes, in order that when either roll is carried out of printing position it will be maintained out of contact with the other roll. The outer edges of the racks against which the guiding rollers 157 bear, are, of course, parallel to the respective pitch lines of the rack teeth.

Manual operating mechanism is provided to move the rolls as above indicated. This mechanism is as follows: Suitably carried on the bracket members 153 are pinions 160 in constant mesh with the rack engaging gears 147, and for operating the pinions 160, the bracket members 153 additionally carry pinions 161, adapted to be engaged by socket wrenches (Fig. 20; socket openings at 162 and 162a). It will be seen that a socket wrench may be applied to the socket 162 and through the intermediary of the pinions 161 and 160, the gear 147 may be turned in a clockwise direction, as indicated in Fig. 21. This clockwise turning movement frees the outer ends of the stub shafts 124 from the embrace of the respective crank pins 138 (note the broken line representation of this action at 124x), in which the open-sided end of the stub shaft is shown as clearing and rolling out of contact with the crank pin 138. When one of the rolls is thus moved out of operative connection with the machine, the other roll is left in operative association with the machine, and the strut device pivots about the stub shaft of this roll, it being understood that when either roll is removed from the machine as just described, the rolls are standing out of contact (see Fig. 20). In Fig. 21, the roller 157 bearing on top of the rack 149 is shown maintaining the pattern roll out of contact with the transfer roll, and likewise the driving gears of both rolls are somewhat separated, but not completely unmeshed.

It is convenient at this point to note certain characteristics of the drive for the pattern and transfer roll, which drive is also common to the inking mechanism. Most of the detailed characteristics of the driving mechanism will be referred to in detail hereinafter, but for the present, attention is called to the fact that the driving gears 122 of both rolls are driven from two main vertical drive shafts 170, see Figs. 2, 7 and 20, supported on suitable brackets 171 in the machine, and driven by bevel gear couples 172 connecting a horizontal driving shaft 173 to both vertical shafts. The horizontal shaft is carried on fixed sleeve brackets 173' and 173'', but the manner in which this horizontal driving shaft is turned in the operation of the machine is one of the features which will be hereinafter described.

The bevel gear arrangement with a common drive shaft 173 in the figure just mentioned, results in turning the vertical drive shafts in opposite directions for balanced driving effect on both ends of each and all the elements driven. Power is taken off the vertical shafts 170 to drive the pattern and transfer rolls in the same manner, and therefore only one power take off will be described in detail.

Referring now to Figs. 9 to 11 and Fig. 20, it will be seen that associated with each roll, there are yoke mountings 174 for bevel gears 175 on the respective shafts 170. These bevel gears are suitably splined as at 175' on the respective shafts to allow them to slide on these shafts in constant driving relation therewith. As shown, the gears are journalled in lower arm portions 174' of the yokes, there being upper arm portions 150 of these yokes 174", slidably embracing the shafts 170, the shafts being turnable therein. Extending crosswise of the machine and supported by the yoke devices—journalled in respective arm portions 174" thereof—are shafts 178, which carry bevel gears 179 in mesh with the bevel gears 175. The bevel gears 179 have adjustably secured thereto (for initial adjustment, in setting up the machine) spur gears 180. As shown, there are a series of studs 181 (see Fig. 11), arranged to enter arcuate slots 182 in the gears 180, so that these gears 180 may be turned slightly with reference to the bevel driving gears and locked in adjusted position.

For supporting the yoke devices 174 and the bevel and spur gear members associated therewith, we provide cam levers 183 pivoted on suitable pins 184 to the inner extremities of the racks 149 and 149a, previously described. The levers each have studs 185 extending into and fitting openings in the yoke members in line with the shaft 178, as shown best in Figs. 9 and 10. The free ends of the levers (opposite the studs 185) respectively underhang and overhang the slotted ends of the stud shafts 124 of the pattern and transfer rolls, these ends of the arms being in the nature of shoes having cam surfaces at 186 and cylindrically generated surfaces at 187. The cylindrically generated surfaces are normally pressed against the outer end portions of the stub shafts 124, the upper and lower levers being forced toward the respective stub shafts by suitable connecting links 188 pivoted at their opposite ends to respective levers 183, the links having telescoping parts acted on by suitable springs 189. Now, as either of the stub shafts 124 (carrying the pattern or transfer roll, as the case may be) is moved out of normal position (see Fig. 20) to move the pattern roll into the position shown in Fig. 21, for example, the ends of the stub shafts 124 occupy positions corresponding to the broken line indication at 124x, Fig. 21, causing one pair of arms 183 to be rocked on their pivots thereby, in the case of the arm associated with the pattern roll, raising the yoke device 174, together with the gears 175, 179 and 180.

Now, it is obvious from Fig. 21 that the act of swinging the pattern roll and its driving gears out of position, as just described, causes a counter-clockwise movement of the pattern roll driving gears 122. A slight counter-clockwise movement of these pattern roll driving gears prior to the time the gears disengage the driving pinions 180 is permitted by raising the yoke 174 and gears supported thereby, including the gears 180. Hence, the gears 180 do not tend to turn their shafts and subsequently, when the pattern roll is brought back to its initial position, the oncoming ends of the stub shafts 122 ride on the cam surfaces 186 and again displace the gears 180 upwardly to receive the teeth of the gears 122, exactly in the relative position between these gears, previously occupied. Thus, the rolls are always maintained in registration relationship and in the same relationship to the driving mechanism of the machine.

It will be hereinafter shown that when either the pattern roll or the transfer roll is moved out of its normal operating position as just described, these rolls may be turned by the driving mechanism of the machine, there being a hand wheel provided in the driving mechanism (see 190, Figs. 1 and 3) whereby the rolls may be turned slowly. This makes plate and blanket changing, on the pattern and transfer rolls respectively, a very easy matter, and further, makes it possible to make alterations in or repairs to the printing surfaces at any desired time, features which so far as we know are not present in offset printing machines heretofore known.

It will be seen from Figs. 3, 9, 10, 20 and 21 that we have provided for locking two main printing elements, namely the rolls 107 and 108, rigidly in position whenever the two rolls and their shafts occupy the relative position shown in Fig. 20 and the machine is in motion. At such time, the stub shafts 124, which are pressed into the tubular shafts 123 on which the rolls are journaled, have a tendency to turn with the respective rolls. Therefore, the sockets in the ends of the stub shafts 124 seat tightly against the crank pins 138 and are thus frictionally held in this position as long as the rolls are turned, as stated. Referring particularly to Figs. 11 and 20, it will be further seen that the driving gears 180, being pivotally supported by the cam levers 183, have their driving forces taken up by the levers. These forces act oppositely, substantially along the plane of the two shafts 170 so as to force the free ends of the cam levers tightly against the projecting ends of the stub shafts 124, locking the stub shafts in place.

It will be remembered that the rolls 107 and 108 are separated automatically upon shutting down the machine and therefore the automatic release of the rolls from their fixed operating positions upon ceasing to drive the rolls through the gears 180 and 122 becomes highly important. Notwithstanding the fact that the rolls are rigidly locked in position when the machine is running, there is practically no force opposing roll separation when the machine stops other than that of the springs 189.

Referring now to the work supporting roll or platen 110, previously mentioned and which is disposed below the transfer roll and carries work delivered by the conveyer into printing contact with the transfer material on the transfer roll, this is also supported by the main frame members 101 and 102. The platen is vertically adjustable in order to rise against the work just as the forward edge of the work is delivered past the uppermost roll surface. Instead of an eccentric adjustment arrangement, such as provided and previously described, for the pattern and transfer rolls and the inking mechanism, the platen has a vertically slidable support and the support and platen float with reference to the roll driving mechanism, and the platen is automatically raised and lowered on its floating support at the proper time to press the work into rolling contact with the transfer roll.

Referring particularly to Figs. 3, 4 and 6, the platen 110 has a central shell-like body 200 with inwardly directed end disc formations 201, and suitably seated in central apertures in the disc portions are hub members 202. The hub members are embraced by respective vertically slidable supports 203, one at each end of the roll, and the supports may slide in suitable guideways 204 rigid with the respective side frame members 101 and 102. As shown, the slideways are carried by mutually separable portions of the side frame members, there being horizontally movable separate sections 205 (see Figs. 3, 4 and 6), permitting the entire platen mechanism to be removed as a unit from the machine. The platen is driven by a hollow through shaft 208 which in the working position of the platen is substantially concentric therewith, as shown in Fig. 3.

The manner in which this platen driving shaft is turned will be presently described, but for the moment, it may be noted that the supports for the shaft include relatively heavy fixed sleeve members 209 and 210, which will be hereinafter more fully described, the innermost ends of which are held in place by being clamped between the movable and fixed sections of the main frame members, these clamping devices including, as shown, clamping bolts 213, Fig. 3.

Fixedly secured to the driving shaft 208 are a pair of driving arms 215 which ride in radial slideways 216 respective to the hub members 202, which, as stated, are secured fixedly to the platen. Both hub members are provided with enlarged openings 217 for loosely receiving the shaft 208 and as the platen is moved upwardly, the openings become eccentric to the shaft 208 (see Fig. 4, for example, showing the raised position of the platen).

To raise the platen, we provide a series of bearing rollers 218 operating in fixed position on a suitable shaft 219, the latter being supported at its ends by suitable bearing bushings 220 in the side frame members 101 and 102 and intermediately of its ends on heavy brackets 221, rising from the bed 103 from the machine. There are two pairs of rollers 218 and each pair rolls against a double trackway 222 on the outer surface of the platen, which trackway, as shown in Figs. 27 to 29, has substantially a quarter of its surface depressed inwardly as at 223. When the surfaces 222 of the platen are riding on the rollers 218, the platen is raised, as shown in Fig. 29, and when the surfaces 223 come into contact with the rollers, the platen is automatically lowered, but the driving connection between the shaft 208 and the platen remains undisturbed by reason of the fact that the driving arms 215 operate in radial slideways 216, as described.

To provide for aligning work supported on the conveyor chains 111, the chains have a suitable number of yieldable work engaging abutments 225 (see Fig. 28) provided on suitable plunger members 226, which are in turn supported by cross bars 227 fixed to the conveyor chains in any suitable way, such as will hold the plungers in parallel relation to the chains. These plungers are adjustable in position by reason of the chain driving mechanism, to be hereinafter described, so as to accommodate work of different lengths, but assuming this adjustment for the moment and referring to Fig. 27, this shows the advancing edge of the work blank W being carried between the transfer roll and platen as on the conveyer chains. The transfer roll has its transfer surface in line with the upper surface of the blank, a projection of which is indicated by a broken line at $w'$. It may be noted that the uppermost surface of the platen 110 is below the plane of the lower surface of the work, a projection of which is indicated by a broken line $w''$. Now, as the work progresses toward the bite of the transfer roll and platen, a series of work registering arms 230 are brought into position just ahead of the advancing edge of the blank; one of the arms 230 is shown in Fig. 28 just reaching this position.

The work aligning arms 230 are carried on a rock shaft 231, suitably mounted in the platen and normally the arms are maintained in the position shown in Fig. 27, by suitable springs 232 positioned adjacent the ends of the platen and acting on arms 233 on the shaft 231 to maintain this position of the arms 230. Now, the arms 230, as indicated in Figs. 27 and 28, have their blank contacting surfaces inclined from a radial plane of the platen, but as the platen is further driven in the direction of the arrows (Figs. 27 to 29), and raised as in Fig. 29, cam rollers 235 on suitable arms 236 rigid with the rock shaft 231 ride under cam surfaces 237 on relatively fixed cam blocks 238 moving the arms 230 toward the work and actually moving the work. The cams are supported on the sliding blocks 203. The result of the rollers 235 passing from a position shown in Fig. 27 with reference to the cam blocks, and into the position shown in Fig. 28, is that the work blank W is thrust against the work feeding plungers 225, thus firmly holding the oncoming edge of the blank in exactly the desired position. If the blank, for example, has received a previous impression from a different pattern in the same machine, it will be clear that with a new platen supporting surface properly located on the pattern supporting surface of the pattern roll, the new impression will be in absolute registration relationship with the previous impression on the blank. It may be noted that the rises 237 of the cams 238 are continued circumferentially of the platen to a sufficient extent to insure that the work blank is fully gripped by the transfer roll and platen before the work is released from the positive action of the positioning arms 230.

It has been previously shown that during the printing operation, the transfer roll is held in operating position (Figs. 27 and 28) by the eccentrics 130 and arms 134, and likewise that the pattern roll is held in contact with the transfer material and the inker lowered into contact with the pattern. The mechanism for governing and adjusting the positions of the eccentric arms 134 is such that all the printing elements mentioned are simultaneously separated and brought together and a single adjustment suffices to condition the machine for printing on thick or thin work. This mechanism will now be described.

Referring to Figs. 2, 3, 5 and 7, it will be seen that the arms 134 of the eccentric adjusting devices heretofore described for the pattern and transfer rolls and for the inking mechanism are provided with downwardly extending links pivoted to the arms. These links operate together to lower the rolls and inker as required to bring these mechanisms into action as soon as the machine is started. It has been shown that when the arms 134 are brought into a relationship shown in Fig. 18, the inking mechanism is lowered onto the platen, the pattern and transfer rolls are brought together, and further, the transfer roll is brought into the plane of the upper surface of a work blank of a thickness indicated by the space between the transfer roll and platen of this figure. For work of less thickness, the relationship of the arms 134 is of course different, as these arms will then all be raised from the position shown to lower both rolls and the inker.

Referring to Figs. 2, 3 and 5, there are links 240 secured to the lowermost arms 134, which links are in pairs, each pair being secured to two generally horizontally extending arms of respective bell cranks 241. The bell cranks are pivoted coaxially with the shaft 219 (see Fig. 3) and each crank has downwardly extending arms 241', which, as shown in Figs. 3 and 5 carry pivoted blocks 242 embraced by vertical guideways in yokes 243 on the enlarged heads of sleeve devices 244 (Fig. 5; one being shown). The sleeves slide in brackets 245, and threaded into the sleeves as at 246 are horizontal links or operating bars 247 which are moved horizontally by eccentric cams 248 on a cam shaft 249 supported in suitable brackets 250 on the side frame members. The connection from the cam 248 to the bar 247 is shown partly in dotted lines in Fig. 5 and comprises a strap 251 embracing the cam and connected by a suitable swivel cross head 252 to the bar.

The uppermost eccentric arms 134 (for the inking mechanism) are connected by links 260 to bell cranks 261 pivoted to the shaft 219 and which have arms 261' swinging between the arms 241' and connected by suitable slide blocks to heads 263 threaded on hollow sleeves 267 at 266. The sleeves surround the bars 247 and may be moved lengthwise of the latter, but are keyed to the bars at 266' to prevent relative turning of the bars and sleeves. For moving the sleeves to thus raise and lower the links 260, there are larger eccentrics 268 on the shaft 249 respectively connected to the sleeves 267 by straps 271 and swivel cross heads 272. The throws of the eccentrics 248 and 268 being different, the sleeve 267 and bar 247 are moved different distances upon half rotations of the cam-shaft 249. It will be hereinafter shown that upon stopping the machine, the cam shaft 249 is rotated to the position shown in Fig. 5 and upon starting the machine that the shaft is rotated 180° from this position and held there during the continued operation of the machine.

The unequal throws of the eccentrics 248 and 268 result, as will be obvious from Fig. 5, in raising and lowering the links 260 through greater distances than the links 240. Note, for example in Fig. 5, that the lowermost arm 134 is depressed but a slight distance whereas the uppermost arm 134 is lowered through a considerably greater angle from its horizontal position, illustrated in Fig. 18. The intermediate set of arms 134 are turned through an angle which is more than the operating angle of the lowermost arms and less than the operating angle of the uppermost arms by differential linkage connections arranged as follows:

Pivotally connected as at 275 to the links 240 are bent links 276. The upper ends of links 276 are pivotally connected as at 277 to levers 278 extending generally horizontally, and pivoted to the links 260 at 279. There are adjustable links connecting the levers 278 and the intermediately positioned eccentric arms 134 of the pattern roll. The position of these links is shown at 280 and the links incorporate suitable turn buckles 281 for fine adjustment of the pattern roll with reference to both the inking mechanism and the transfer roll.

It may be seen from Figs. 5 and 19 that upon positioning the controlling cams 248 and 268, as shown in Fig. 5, the transfer roll is raised from work contacting position a slight amount; further, that the pattern roll is raised a greater distance relative to the work in order to separate the pattern and transfer surfaces, and also that the inking mechanism (see particularly the uppermost two small rollers in Fig. 19, to be later described) is raised a still greater distance.

The separation relationship of the different rolls is the same for all adjustments of the transfer roll for different thicknesses of work blanks and adjustment for blank thickness is effected by suitable gears 285, the hubs of which (see Fig. 5) are maintained in fixed longitudinal position by suitable brackets 286. The hubs of the gears 285 are keyed or splined to the sleeves 267 in order to turn the sleeves, and the bars 247 being keyed to the sleeves are also turned thereby to thus vary the effective throws of both sets of bell cranks 241 and 261. This variation, as may be seen, does not change the position of the bell cranks 241 and 261 with reference to each other, and therefore, irrespective of the fact that in its lowered position the transfer roll may almost touch the platen in one adjustment, the separation of the rolls and the inking mechanism from the pattern will still be the same as illustrated in Fig. 19.

To effect the adjustment for blank thickness, the gears 285 mesh with gears 288 on a common supporting shaft 289 (see Fig. 7) supported in the side frame members. The shaft carries a gear 290 meshing with a gear 291 on a dial supporting jack shaft 292, suitably supported in one of the side frame members and a bracket 293 associated therewith, the shaft having a dial at 294 adjustable as by means of a spanner wrench and capable of being locked in adjusted position in a suitable recess 295 of the bracket 293. The adjacent surface of the bracket 293 may carry any suitable pointer or indicator to show how much the dial is turned from zero or other initial setting.

In order to enable the driving and control mechanism to be more clearly understood, a diagram of the essential driving parts is illustrated in Fig. 8. This figure however, shows only the general cooperative relationship of the various driving parts and reference will be directed to other figures for detailed characteristics, and the actual shapes of the parts diagrammed.

In Fig. 8, there is indicated a motor shaft A, coupled with a driving sprocket 300 by a suitable main clutch B. The driving sprocket 300 is connected by a suitable belt 300' to a driving sprocket 301 on the sleeve 210 (Fig. 3), which latter sprocket is in constant driving relationship with the printing roll and inking mechanism driving shafts 170 and 173, previously mentioned, but in intermittent driving relationship with the work supporting platen, the work conveyer and the elevating mechanism of the pattern and transfer rolls and the inker.

Tracing the drive on the diagram, it will be seen that the driving sprocket 301 (see also Fig. 3) has rigid therewith gears 302 and 303. The gear 302 is in constant mesh with a gear 304, fast on the shaft 173, which through bevel gearing 172, drives the vertical shafts 170. The shaft 173 (supported on fixed hollow brackets 173' and 173'' in the main side frame members; see Fig. 6) is continued beyond the bracket 173'' and carries a driving pinion 305 meshing with a platen and conveyer mechanism driving gear 306 freely journalled on the fixed bracket 209 of the platen mechanism (see Fig. 3). The gear 306 is thus rotated constantly during operation of the driving sprockets 300 and 301. For coupling the gear 306 to the conveyer and platen drive, the gear 306 has a pair of diametrically spaced index openings 307 and 308. The opening 307 is the larger of the two. The platen 110, as previously stated, is constantly connected to its hollow shaft 208 and the latter has keyed thereto, a gear wheel 309. The wheel is adapted to be adjustably locked to an index disc 310 which slidably carries index pins 311 and 312 for cooperation respectively with the openings 307 and 308 on the driving gear 306. As shown in Figs. 2 and 3, there are T bolts at 309' securing the gear 309 to the index disc. The index disc 310 can only be secured to the driving gear 306 in one position, there being but one larger hole 307.

In order that the conveyer may have its blank advancing portions settable to enable a selected length of blank to be printed from any portion of the pattern or plate, the conveyer and platen may be adjusted in unison with reference to the pattern rolls. As shown (see particularly Figs. 3 and 7), the gear 309 drives an idler 315 which in turn drives a gear 316 on a main conveyer driving shaft 317 carrying the driving sprockets 113, previously mentioned, for the driving chains 111.

Referring again to Fig. 3, it will be seen that the conveyer and platen driving gear 309 is adjusted with reference to the index disc 310 and thereby with reference to the driving gear 306, simply by reason of turning the gear 309 and the disc 310 relatively and locking the two in adjusted position by the T bolt connection mentioned. Suitable graduations at 320 (Fig. 2) on the disc 310, visible through a suitable slot 321 in the gear wheel 310, enables the platen and conveyer lugs to be set for printing from different portions of the design, as will be obvious.

The machine is set for different blank lengths by a suitable adjusting dial connection in the conveyer drive. The dial, as shown, comprises a separate hub member 325 for the gear 316, which hub is keyed to the shaft 317, the gear being releasably fixed to the hub as by a series of screws 326. This enables the conveyer driving shaft 317 to be turned backward or forward without moving the platen, and reset in a new position. The dial may indicate the length of work in any desired scale on the gear 316, for example, and a suitable pointer on the hub member 325.

Referring to both Figs. 3 and 8, it may be noted that the index pins 311 and 312 are controlled in their positions with respect to the index openings 307 and 308 by an operating bar 330 extending through the hollow platen driving shaft 208. The bar is arranged to be shifted manually to its index pin inserting and withdrawing positions and the manual control is interconnected with the main roll drive control and the roll and inker elevating mechanism control, in order that the platen and conveyer will be properly coordinated with the rolls at the time the machine is started.

The roll and inker elevating mechanisms include the gear 303 (rigid with 301 and 302, as previously stated) which is in meshing relationship with a mutilated gear 335 freely journalled on the fixed sleeve 173', as shown in Fig. 7. The gear 335 carries driving sprockets 336 for driving chains 337 which control the position of the large and small eccentrics 248 and 268, previously described, and the operative positions of which are shown in Fig. 5. It will be remembered that when the eccentrics are in the position shown in Fig. 5, the rolls are separated and the inker raised. The operating condition of the eccentrics in the diagram, Fig. 8, corresponds to the position of these eccentrics in Fig. 5 and the eccentric roll adjusting device, shown diagrammatically at 130, is in the corresponding position, in which the transfer roll, for example, is raised.

Whenever the machine stands idle, the pattern and transfer rolls and the inker are separated and the first operation of the gear 303 on starting up the machine is to move the gear 335 to such position that the three printing mechanisms just mentioned are brought together. The mechanism for effecting the above is shown particularly in Figs. 7, 14 to 17 inclusive, and in diagram Fig. 8.

The gear 303 drives the gear 335 only half a rotation and then the gear 335 stops because a few teeth are missing at diametrically opposite points, namely at 338 and 339, Fig. 14. In other words, when the machine is started, the gear 335 travels until the main rolls and inker are brought into cooperative relationship and then the gear 335 stops; and when the machine is shut down, the gear 335 travels until these main rolls and the inker are disassociated and then the gear 335 again stops. Suitable means for holding the gear 335 in its two stopped positions may comprise spring detents 340 on the gear (Figs. 6 and 14) operating in suitable diametrically opposite recesses in a flange 341 on the fixed sleeve 173'.

To again start the gear 335, after being stopped in either position above stated, there is provided a sliding shifter bar 345 (see particularly Figs. 14 and 16), which shifter bar is interconnected with the control bar 330 of the index pins through a suitable arm 346 thereon, engaging a collar 347 on the bar 330 through a suitable opening in the fixed sleeve 210 (see Fig. 16). The shifter bar 345 is provided with manual operating means, shown diagrammatically as a lever 348 (see Fig. 8), connected with the bar in the usual fashion, which lever, it may be assumed, has a suitable operating connection with the manual operating means of the main clutch B, arranged in such manner that when the clutch B is operated to start the machine, the lever 348 is also operated to adjust the rolls and inker for operation and (through the arm 346 and bar 330) position the index pins 311 to start the platen and conveyer in operation.

The interconnections between the shifter bar 345 and the gear 335, whereby the gear 335 is started from its two stopped positions, upon each re-positioning of the bar 345, are as follows: The gear 335 has two sliding plates 350 on respective sides thereof as well as diametrically opposite. These may be supported, as shown in Fig. 17, on studs 352, extending normal to the plane of the gear and slidably engaging the respective plates, there being suitable springs provided as at 353 to hold the plates 350 in the positions with respect to the gear shown in Fig. 15. Each plate 350 has a rounded end 354 adapted to engage respective cams 355 associated with the driving gear 303 at opposite sides thereof, as shown in Figs. 8 and 14. Normally however, the cams 355 pass by the plates 350, the cams and plates being in different planes, and means are provided on the sliding bar 345 to shift both sliding plates 350 into respective positions in which they may be engaged by the cams 355 to thus start the gear 335 and bring teeth thereof into mesh with teeth of the driving gear 303. As shown, this means includes a suitable yoke 356 (see Figs. 14 and 15), having spaced arms 357 disposed to contact with the plates 350 and move one or the other into the plane of the respective cam 355, depending on the direction in which the bar 345 is shifted. It will be seen from Fig. 8 that when the bar 345 is shifted to the right, the plate 350 at the left hand side of the gear as there shown, is shifted into position to engage the corresponding cam 355, and thereby start the gear 335 in its operation to lower the transfer roll, the pattern roll and the inker into mutual cooperative relationship. The bar 345 may be held in its two operating positions by a suitable detent 358 on the side frame member 102, operating in suitable notches 359 of the bar 345.

It will be seen from the above that whenever the main clutch B is operated to start the machine, the pattern and transfer rolls are brought together, the lowermost inking rolls with the inking mechanism generally, are lowered onto the design or pattern plate and the rolls and inking mechanism remain in this position so long as the machine is being driven. Further, the rolls and the inking mechanism are immediately started in their turning operations, as has been shown, and the same starting operation couples the platen and conveyer to the driving gear 306 in a predetermined relationship thereto, whereby the blanks supported on and fed by the conveyer will be printed from the desired selected portion of the design or pattern.

Referring now to the inking mechanism, particularly Figs. 2 and 3, 22 and 26, it has been previously brought out that this mechanism is carried on a super-structure frame work, including upper frame parts 104 and 105, which are adjustably mounted on separate sets of racks 140 and cooperating pinions 141, the actual raising and lowering movement occurring by reason of turning the uppermost eccentric devices 130 by the operating bars 260. We will now describe the arrangement of inking rollers and the drive therefor.

The inking mechanism is duplex in character, primarily in order that tinting inks and opaques may be used in rapid succession or simultaneously if desired, but further in order to obtain greater uniformity and/or intensity of color when desired.

The arrangement of rolls is best brought out in Fig. 4 wherein it will be seen that the upper frame members 104 and 105 carry ink fountains at 370 and 371, each fountain being provided with a fountain roll 372 and a suitable ductor roll 373. The ductor rolls alternately contact with the respective fountain rolls and distributor rolls 374 in the usual way. Each distributor roll 374 divides the ink by contacting with two composition rolls 375 supported on linkage which will be hereinafter described and which provides for separating the composition rolls from the adjacent distributor rolls when the machine is stopped. Ink is taken off the composition rolls 375 by a large distributor roll 376. Below this are two composition rolls 377, also supported by linkage to be described, and these latter composition rolls deliver the ink to respective distributor rolls 378. Finally, the distributor rolls 378 divide the ink thereon and distribute it each to two composition rolls 379, there being four of these in all, each arranged to contact with respective distributor rolls 378 and with the pattern on the pattern roll. The distributor rolls 374, 376 and 378 are reciprocated, as will be hereinafter shown.

The drive for the various rolls centers at the large distributor roll 376 which is supported on a central shaft 381 extending through both upper frame members and which has drivingly rigid therewith two helical driving gears 382. These helical gears mesh with horizontally disposed driving gears 383 on the vertical shafts 170, being held in position for vertical movement with reference to the shaft by virtue of spaced portions 385 of the frame members 104 and 105 and being slidably keyed to the respective shafts.

Suitable means are provided to maintain the gears 382 from movement along the shaft 381 when the latter is reciprocated. The driving connection between the gears 382 and the shaft includes suitable sleeves, indicated at 386 and 387 (Figs. 3 and 24), the sleeves being splined to the shaft 381 and also keyed as at 388 and 389 to the respective gears. The sleeve 386 and 387 also support other gears for driving the distributor rolls and a distributor roll reciprocating cam, which gears and connections therefrom are as follows:

The sleeve 386 carries a wide-faced gear 390 and the distributor roll shafts, indicated at 374' and 378', have gears at 391 meshing with this wide-faced gear 390 and the rolls are driven thereby as the large distributor roll 376 is turned by the helical gearing 382—383, the gear 390 being made rigid with one of the helical gears 382 in any suitable way. The fountain rolls 372 have gears 372' driven from idlers 372" meshing at all times with the gears 391 (see Figs. 22 and 23).

For reciprocating the distributor rolls 374, 376 and 378, there is provided a cam 392 on one end of the distributor roll shaft 381, which cam is journalled for free rotation on the shaft but is fixed against longitudinal movement thereon. The cam has a groove 393 in which rides a suitable roller 394 carried on a fixed bracket 394' on the adjacent upper frame member 105. The cam is driven by a reduction gear train, including a gear 395, rigid with the gear 390. The gear 395 drives suitable gears 396 and 396' on a counter shaft 396"; the gear 396' being in mesh with a gear 397 freely journalled on the sleeve 387, previously mentioned. The last mentioned gear 397 through suitable drive pins 398, slidably occupying openings in the cam, rotates the cam at a comparatively low speed and causes it to be moved back and forth due to the inclination of the groove, see Figs. 3 and 24, to the two extreme positions therein shown. There are suitable cam followers 400 on the shafts 374' of the upper distributor rollers and followers 401 on the shafts 378' of the lower distributor roll 378, all followers continuously occupying the cam groove. The arrangement is such that, as will be seen from Fig. 24, the upper distributor rolls 374, which are nearest the source of ink supply, are reciprocated a considerable distance, namely, from the full line position 374x to the broken line position 374y of Fig. 24. The large distributor roll 376 is moved a less distance, namely, from the position shown at 376x to that at 376y, and the lowermost distributor rolls 378 are moved the least distance of all, namely from the full line position 378x to the broken line position 378y. This makes a very efficient ink distribution system and the number of parts necessary to effect the varied reciprocation of the distributor rolls is reduced substantially to a minimum.

Supports for the various rolls just mentioned are best shown in Figs. 25 and 26, which two figures show the inking rolls in contacting position, that is, operative to deliver ink to the pattern, and also in non-contacting position, namely, the position in which the machine is left standing after a run of printing. The roll supporting arrangement is unique in that—with the exception of the final composition rolls which are separated when the machine is idle, by virtue of the eccentric elevating mechanism previously described—all the rolls may be separated by a single manual operation.

The fountain rolls are suitably carried in upstanding brackets on the frame members 104 and 105. The ductor rolls 373 are carried by swingable arms 373' on the frame members just mentioned, the arms being pivoted at 373" to respective frame members just mentioned. The distributor rolls 374 are slidably carried by removable brackets 402 on top of the members 104 and 105. The two distributor rolls 378 are swung each from a pair of links, indicated at 405, the upper ends of these links being pivoted to respective sleeves 386 and 387 on the shaft 381.

The composition rolls 379 are carried in suitable upwardly facing slots in cradle members 406 secured as by suitable cross rods 407 to the frame members 104 and 105. It may be mentioned at this point, that in order to remove the pattern roll from its operating position in the machine, as previously described, one of the composition rolls 379 may be removed from the cradle as by hand and with the inking mechanism in its raised position, as described.

All the other composition rolls have similar paired mountings, including levers, which are all mutually interconnected and connected with a common operating means, whereby all the levers may be swung to positions which separate all the composition rolls 375 and 377 from contact with their respective distributor rolls; the linkage and mechanism also acting to spread the arms 405, thereby separating the distributor rolls 378 from the composition rolls 379 at the same time. This arrangement is as follows:

At each side of the machine and adjacent the respective frame members 104 and 105 are a pair of levers 410, each pair being pivoted on a suitable common stud 411. The upper ends of these levers, carry the rolls 375 and depending arms 410 are pivotally connected by suitable links 412 and 413 to supporting arms or levers 414 and 415. The arms 414 support the lower composition rolls 375 and the levers 415 carry the composition rolls 377. The arms 414 are simply bent arms which float about fixed studs 416 in the frame members 104 and 105 and the studs likewise support the levers 415 for pivotal movement intermediately of their ends.

The outer ends of the levers 415 are connected by links 418 with an operating cam arrangement, comprising circular discs 420 on a cross shaft 421, one end of which extends outwardly through the frame member 104 and has a suitable adapter formation at 421' for a wrench or other suitable tool by which the discs 420 may be turned. The lower ends of the links 418 are provided with pivot pins 419, and, as shown in Fig. 3, one end of each pivot pin extends into a respective arcuate slot 422 in the adjacent cam disc and the other ends of which pins extend into diagonal slots 423 in suitable brackets 424 on the cradle end members 406, illustrated in Fig. 25. The brackets 424 are made rigid with the cradle members in any suitable way and the result of turning the cam discs in a clockwise direction, as illustrated in Fig. 26 results in moving the pins 419 outwardly and upwardly in the slots 423 as well as to the outer extent of the arcuate slots 422, thereby shoving upwardly and outwardly on the links 418. A suitable lost motion connection between the links 418 and the arms 405 which carry the distributor rolls 278, may comprise slots 425 in the links 418 and pins 426, which pins near the upper end of the movement of the links 418, engage the lowermost ends of the slots, thereby spreading the links 405 outwardly and carrying the distributor rolls 378 out of contact with the composition rolls 379. This same upward and outward movement of the links 418 just described, rocks the levers 415; one pair in a clockwise direction and the other pair in a counterclockwise direction, thus carrying the composition rolls 377 out of operating position. This turning movement of the levers 415 acts on the links 413 to move one pair of levers in a clockwise direction and the other pair in a counterclockwise direction, to thus carry the uppermost set of composition rolls out of contact with the distributor rolls 374 and 376. Also, the arms 414 carrying the composition rolls 375—being secured by the links 412 to the downwardly extending arms of the levers 410—are moved about their pivots 416 to carry the lowermost composition rolls 375 out of contact with the distributor rolls 374 and 376.

It is thus clear that upon the single operation of turning the cam discs 420 from the position shown in Fig. 25 to the position shown in Fig. 26, all the rolls are separated from each other, with the exception of the ductor roll between the fountain roll 372 and distributor roll 374. This separation however, may be accomplished simply by turning the hand wheel of the machine slightly, if, upon stopping the machine, the ductor rolls happen to be in contact with either of the rolls 372 and 374.

It has been previously noted that the distributor rollers 378 are carried on swinging arms 405 by virtue of which the rolls are moved by the common ink roll separating mechanism, previously described, but as the arms 405 swing about the axis of the cam, the cam follower rollers 401 are maintained in engagement with the cam groove during this roll separating operation.

The ductor rollers 373 which as has been previously stated, are supported on swingable links or arms 373', may be oscillated back and forth between the respective fountain rolls 372 and the first distributor rolls 374, by suitable camming devices shown in the plan view of the inking mechanism, Fig. 23. These may include suitable cams 445 on the distributor roll shafts 374' and cam follower levers 448, maintained in contact with the cams 445 by suitable springs 449 acting to rock the cams about their pivots 450 toward the cams. When, for example, the shafts are reciprocated to the right (Fig. 23), the cam followers stress suitable springs 451, connecting between the upstanding arms 373' and the frame members 105 and yieldingly press the ductor rolls against the respective fountain rolls, whereas when the distributor roll shafts are moved to the left, the cam followers ride inwardly toward the axes of the respective roll shafts and the ductor rolls are pressed against the respective distributor rolls 374 by the direct action of the springs 451.

Referring now to Figs. 4, 12, 13 and 20, it will be seen that there is a suitable dampening mechanism which is mounted as a unit on vertical bars 184', which are supported by the pivot pins 184, previously described. The bars 184' are pivotally suspended from the upper set of pins 184 and guided between lower set of pins 184 in any suitable manner, for example, by slots, see Fig. 21, in the lower ends of the bars 184' so as not to interfere with the separating movement of the rolls and consequent floating movement of the gear mountings 174 and racks 149 and 149a. The bars 184' are extended toward the conveyor side of the machine as at 455, to support between them the dampening rollers and a suitable water supply pan 456. Arranged to turn in the fountain pan 456 is a dampening fountain roller 457 which is supported on a suitable shaft 459, suitably journalled in the bracket portions 455 of the tie bars 184'. Mounted on suitable swingable arms 460, supported on a cross shaft 461 between the brackets, is a ductor roller 463. This ductor roller, preferably a felt roll, is oscillated into alternate contact with the fountain roll 457 and a water distributor roll 464 by suitable means, such, for example, as a cam 465 on the shaft 459, which rides on a suitable follower carried by a link 467, pivoted as at 468 to the adjacent arm 460. This arm has an abutment ear 470 overhanging the lever 467 and the arm follows the lever under the action of a suitable torsional spring 471 in one direction and is pulled in the opposite direction by a suitable tension spring 472 acting upwardly on the outer end of the lever. The distributor roller 464 may be suitably oscillated by a cam 468, Fig. 12, operated by a fixed follower 469. Suitable plate contacting dampening rollers 473, preferably felt or the like, ride in contact with the distributor roller 464 at all times and moisten the printing surface on the pattern roll just previous to any given surface thereof being rolled into contact with the composition inking rolls 379. All three rollers 464 and 473 may be supported in upwardly open slots in the brackets, for easy removal.

We contemplate moistening only a part of the plate if desired to print solidly on any portion of the design; in other words, to kill the ink repellant qualities of the plate in selected regions. For example, the two rollers 473 may have sections of water receptive material slidable to different positions on the respective shafts to thus moisten only parts of the plate.

In case of using so-called "dry offset" printing methods, either by special plate treatment, ink treatment or otherwise, the dampening means may be omitted altogether.

We have arranged to secure the design or pattern plate on the pattern roll and the offset blanket on the transfer roll in essentially the same manner, hence, only one arrangement will be described in detail. Figs. 30 to 33 may be taken to illustrate either roll and the method of supporting a flexible element thereon. Let us assume that these figures illustrate the pattern roll. It will be seen that the hollow drum portion of the roll has a series of circumferentially extending slots at 480 adjacent the inwardly depressed portion of this roll. Directly inwardly from the slots are rock shafts 481 and 482 to which are secured, as by suitable clamping devices, plate attaching pin-carrying frames 484, each provided with a series of outwardly extending pins 485 engaging respective slots 480. The slots are of sufficient extent to permit swinging of the pins therein through appreciable angles, say 15 or 20 degrees. The pins engage suitable holes 488 in the end portions of the plate, the latter being indicated at 487. To hold the plate in contact with respective series of pins 485, there is provided a joint strip at 489 overlying the depressed portion of the drum, the pins and the marginal edges of the plate. This joint strip, as shown, has inwardly disposed channels at 490 in which the ends of the pins projecting beyond the plate may travel. The strips 489 may be secured to the drum by suitable screws 489'.

Referring now to Figs. 34 and 36, it will be noted that the rock shaft 481 has at one of its ends a bent lever 491 rigidly secured thereto in any suitable manner. Likewise, the shaft 482 has at the corresponding end a bent lever 492. The outwardly extending arms of these levers are connected together by a suitable spring 493, tending to rock the shafts in such manner as to swing the two series of pins 485 toward each other; in other words, tending to stretch the plate on the drum portion of the roll. The opposite ends of the shafts 481 and 482 are also provided respectively with outstanding arms 491' and 492' connected by a spring 493', which arrangement merely assists the spring 493 in the function thereof stated. One of the bent levers, namely, the lever 492, shown in Fig. 34, has a laterally extending arm 495 which is engaged by a locking pawl 496. The other bent lever has a lateral extension at 497, provided with ratchet teeth at 498, shown as engaged by teeth of a ratchet toothed pawl 499. The two pawls are suitably pivoted to the adjacent end of the roll and are urged apart by a suitable spring 500 located between them. It will be seen that the operator merely has to secure one end of the plate 487 to one set of pins 485, and turn the roll slowly while maintaining sufficient tension to lay the plate on the roll with a uniform wrapping action, and at the end of this operation place the openings at the free edge of the plate over the other set of pins. To do this, it is necessary to tension both springs 493 and 493', which may be done by releasing the pawl 499 from contact with the ratchet teeth and turning the rock shaft 481 a slight amount as by a wrench in the socket 501, in order that the pins will engage the holes freely. Then merely releasing the tension on the spring will cause the springs to come into action to tension the plate. The wrench is also used after the plate is in position to tighten the plate on the roll, the desired tautness being automatically held by the ratchet teeth at 498, which automatically move into mutual engagement as stated. Thereafter, the joint strip 489 is securely fastened in place.

A suitable form of drying arrangement for completed work is shown diagrammatically in Fig. 1. This includes a suitable drying oven 80 which has side walls 81 and a wall 82 adjacent the printing machine. The wall 82 has a suitable opening therein in registration with the delivery conveyer 117 and through which the completed work may be passed from the conveyer 117 into the interior of the oven. The oven may, of course, be suitably heated in any manner. Within the oven supported as on suitable shafts 84 are a series of sprockets 85. It may be assumed that these sprockets are in pairs, one at each side of the oven, and that each sprocket engages and guides a chain, such as shown at 86. The chains have pivoted thereto at suitably spaced points, work supporting trays 87 suspended from the pivot points 88 by suitable end members, such as indicated at 89. The trays may be thus maintained by gravity in work supporting positions and be carried through the drier at varying elevations for efficient drying. It may be assumed that the chains pass, from the position in which a piece of work W' has been laid on the tray adjacent the delivery conveyor, upwardly over the first pair of sprockets 85, then downwardly over another pair, upwardly over another, then downwardly under sprockets (not shown), and thence to the sprockets 85, one of which is shown in full lines in Fig. 1. Thus, the drying operation is continuous and work remains in the drier for a sufficient period to cause the imprints to become set. The pieces may, of course, be taken off the tray at any point in the procedure, but preferably near the end of the series of sprockets and as the trays are being finally lowered toward the returning position.

In feeding material having no appreciable stiffness—paper, for example—, work blanks of this character may be fed by any known feeding and registering device, which may of course be incorporated in the present machine. This calls for substituting any convenient form of feeding conveyer for the chains 111 and any desired suitable form of paper delivery. Preferably the conveyer comprises a suitable set of overdriving rollers closely spaced and slight skewed in the usual fashion to feed the blanks against suitable side and end registering guides or stops, which need no illustration as this sort of equipment is well known in the art.

Suitable paper grippers of the usual form may be merely substituted for the work aligning devices 230 in the same mountings as shown, and except for the work engaging ends, these may be identical with the work aligning devices shown in Figs. 27 to 29.

The present machine is well adapted to use web feeding in connection therewith—when it is desired to grain with one impression only, for example. This is particularly desirable when using a continuous pattern roll in place of the flexible plate, but may be used in either case.

We claim:

1. In a printing machine, a pair of printing rolls, gears on each of said rolls, a driving shaft with driving means, including a driving gear adapted to mesh with the gear of one of said rolls, the last named roll being movably mounted so to be removed from operating position with the gear thereof drivingly disassociated from the driving gear of said driving shaft while remaining in driving relationship to the gear of the other roll, whereby the rolls will be maintained in registration relationship to each other and in a constant relationship to the driving shaft.

2. In a printing machine, a pair of printing rolls, mutually meshing gears on said rolls, means including a curved rack and guide for moving one of the rolls out of its operating position while maintaining the meshing relationship between said gears, said means including a pinion on the roll arranged to mesh with the rack and adapted to be turned to move the roll along the rack.

3. In a printing machine of the offset type, a pattern roll, a transfer roll and a platen roll, driving means for said members and adjustment devices whereby said rolls are separated from operative relationship, said adjustment devices acting simultaneously to separate said rolls by movements in true planes coincident with the axes of each two adjacent rolls.

4. In a printing machine, a roll adjustment, including an eccentric and means to operate the same, and a motion governing device whereby the movement translated by the axis of the said roll under the action of the eccentric to move the same from one position to another is in a true plane.

5. In a printing machine, a frame, a printing roll, a supporting device therefor turnably mounted on the frame, a crank having relatively offset crank pins connecting said device to the said roll, one of said pins being eccentrically supported in said device, and means connecting the crank to the frame for turning the same in opposition to the turning movement of said device to thereby move the roll axis in a true plane.

6. In a printing machine, a pair of printing rolls and an inking mechanism, separate mountings for the rolls and inking mechanism by which said rolls and inking mechanism may be moved relatively different distances, and a common operating means whereby one roll is moved a greater distance than the other roll and whereby the inking mechanism is moved a still greater distance, all in one operation.

7. In a printing machine, a pattern roll and movable unitary inking mechanism therefor, a transfer roll in operative relation with the pattern roll, a frame supporting said rolls and including mounting devices respective to said rolls and inking mechanism, and mounted on the frame, there being a common adjusting device operating on all said mountings for simultaneously separating the rolls and inking mechanism and bringing the same into operative association.

8. In a graining machine, a pattern roll, a transfer roll and platen, inking mechanism for the pattern roll and means for moving the transfer roll and the pattern roll different distances with respect to the platen, whereby the transfer roll is moved out of operative position and the pattern roll is moved out of contact with the transfer roll, said means also acting at the same time to move the inking mechanism as a unit from operative contact with the pattern roll.

9. In a graining machine, a pianographic offset printing mechanism, including a form roll, an offset roll and a supporting roll, work aligning devices movably mounted on said supporting roll and extending from the supporting surfaces thereof, conveyer means for presenting work to said roll and means acting on said aligning devices for moving the work on the conveyer to align the work after the same has substantially reached the printing position with respect to the supporting roll.

10. In a graining machine, a pianographic offset printing mechanism including a form roll, an offset roll and a rotary work support, a conveyer means on the work support for positively engaging the advancing edge of work on the conveyer, yielding abutment means on the conveyer for engaging the trailing edge of work on the conveyer, and means associated with the said support and acting on the work engaging devices thereof for moving the work on the conveyer and causing each printing operation to begin at a predetermined position on the work.

11. In a printing machine, a planographic offset printing mechanism, comprising a form roll, an impression transfer roll and a platen, a conveyer for presenting work between the elements of said couple, work aligning devices on the platen, and means cooperating with said devices to positively move the work rearwardly to accurately position the work on the conveyer at the beginning of each printing operation.

12. A graining machine, including an impression roll and a platen roll, a conveyer for presenting work between said rolls, raising and lowering means for one of said rolls, and means acting on the said raising and lowering means to move the rolls relatively toward each other as the advancing edge of a work blank is presented to the bite of said rolls.

13. In a printing machine, a rotary printing couple including a work supporting platen, a driving shaft extending into the platen and constantly drivingly coupled therewith to turn the same, a slidable support for the platen through which said shaft extends, and means for raising and lowering the platen independently of the driving shaft to contact with the work.

14. An offset printing machine including a pattern or form roll and a transfer roll, means common to both of said rolls and adapted to support and guide said rolls, selectively, for substantial bodily movement out of operative position to positions rendering substantially the entire circumferences thereof accessible to an operator.

15. In a printing machine, a plurality of cooperating rolls, including a pattern or form roll, means cooperating with two adjacent said rolls for interchangeably guiding the same for movement out of printing position to respective positions rendering substantially the entire surfaces thereof accessible to an operator, and means for maintaining the roll thus guided out of printing position in driving relationship to the other roll.

16. In an offset printing mechanism comprising a form roll, an inking mechanism and a dampening mechanism therefor, an offset roll, and means to maintain work in printing contact with the offset roll; the combination therewith of means for guiding and supporting the form roll for movement to an inoperative position relative to both the inking mechanism and offset roll such that substantially the entire circumference of the form roll is rendered accessible to an operator, while maintaining the dampening mechanism in fixed position.

17. In an offset printing machine comprising a form or pattern roll, an inking mechanism, a dampening mechanism and an offset roll, means for supporting said inking mechanism above the form roll, means to support the dampening mechanism at one side of the form roll, means for supporting the offset roll beneath the form roll, means to maintain work in printing contact with the offset roll, and a movable mounting for the form roll arranged to guide said form roll out of operative position from between the inking mechanism and offset roll and in a direction opposite the dampening mechanism, whereby the dampening mechanism retains its position for subsequent cooperation with the form.

18. In a printing machine, a form or pattern roll and a transfer roll, means associated with the transfer roll whereby printing may be done therefrom, both of said rolls being movable out of printing position to positions rendering substantially the entire circumferences thereof accessible to an operator, and means retaining the rolls in registration relationship to each other, when moved as stated.

19. In an offset printing press, a form or pattern roll, an offset roll and interconnecting gearing, one of said rolls being mounted in the machine and adapted to be moved to a position rendering substantially the entire surface of said roll accessible to an operator, and means comprising arcuate trackways operatively engaging the movable roll and guiding said movable roll to maintain the elements of the gearing in mesh, thus maintaining the rolls in registration.

20. An offset printing press including a form or pattern roll and an offset roll, both said rolls being mounted in the machine and adapted to be separately swung to respective positions rendering substantially the entire surfaces of said rolls accessible, and means guiding each roll for movement substantially about the axis of the roll remaining in position.

21. In a printing machine, a form or pattern roll and a transfer roll, mountings for said rolls, mutually meshing gears on said rolls for maintaining the same in register, links interconnecting the mountings for said rolls, and arcuate trackways engaging the mountings of one of said rolls for guiding the latter out of normal operative position while maintaining the said gears in mesh, thereby preserving registration of the rolls.

22. In a printing machine of the offset type, a pattern roll, a transfer roll, and a platen, means for relatively separating the transfer roll and platen sufficient distances to accommodate work of different thicknesses, and means operated by the first named means to separate the pattern and transfer rolls substantially the same distance from each other irrespective of the distance the transfer roll and platen are separated.

23. In a printing machine of the offset type, a pattern roll, a transfer roll and a platen, a common means for relatively separating said elements and bringing the same into cooperative relationship and an adjustment device acting on said means for varying the distance between the transfer roll and platen, said adjustment being effected without changing the relative setting of the pattern roll and transfer roll.

24. In a printing machine, a frame, a roll carried by the frame and means cooperating with the roll to effect printing, a gear on the roll, a driving gear in driving relation thereto, a movable clamp cooperating with the roll to maintain the roll in operating position, and means operably connecting the driving gear to the clamp for maintaining the clamp in clamping position consequent upon the driving gear becoming active to drive the roll.

25. In a printing machine, a frame, a roll carried by the frame and means cooperating therewith to effect a printing impression on work in the machine, means for guiding the roll for bodily movement out of its operating position to a position rendering substantially the entire circumference thereof accessible to an operator, a gear on the roll, a driving gear adapted to mesh with the aforesaid gear to drive the roll, a movable mounting for the driving gear, clamping means for positioning the roll in operating position, said clamping means being rendered active by said gear mounting consequent upon turning of the driving gear in a direction to turn the roll to effect printing.

26. In a printing mechanism, a pair of cooperating rolls both arranged to be shifted normal to their axes for adjustment, a gear on one of said rolls for driving the same, a driving gear cooperable therewith, clamps respective to said rolls for clamping the same in operating position when the clamps are active, a floating compensating connection for permitting movement of the clamps different distances in accordance with adjustments of the rolls to operatively engage the respective rolls, and means operable by the driving gear and cooperating with said compensating connection for moving both of said clamps into operating position and for holding said clamps in the clamping position under substantially equalized pressure.

27. A machine for decorating surfaces in simulation of wood, marble and other grain effects comprising a planographic form or pattern roll adapted to carry the grain pattern, inking mechanism therefor, a transfer roll arranged to cooperate with the form roll, pusher means adapted to engage the trailing edge of a work blank and carry the work into cooperative relation with the transfer roll and deliver the printed work therefrom in a straight path, and registering means acting in opposition to the pusher means to correlate the surface to be printed with the pattern transfer.

28. In a machine for decorating surfaces in simulation of wood, marble and other grain effects, a frame, a planographic form or pattern roll and inking mechanism associated therewith, a transfer roll and a platen roll, one roll disposed below the other on said frame in the order stated, means to drive said rolls, and conveyor mechanism including yielding pusher devices arranged to engage the trailing edge of a work blank and carry the work blank to between the transfer roll and platen and to deliver the work in a straight line clear of said rolls, and aligning devices on one of said rolls arranged to engage the advancing edge of the work blank and move the same toward the pusher devices on the conveyor mechanism to insure printing on the blank in predetermined relationship to the said advancing edge thereof.

29. In a machine for decorating surfaces in simulation of wood, marble and other grain effects, a frame, a planographic form or pattern roll, inking mechanism associated therewith, a transfer roll and a platen roll, the latter being disposed below the transfer roll, conveyor mechanism arranged to carry work to and between the transfer roll and platen in a straight path, yielding means on the conveyor adapted to carry the forward edge of a work blank to printing position between the transfer roll and platen, aligning mechanism acting on said blank to register the same by movement of the blank on the conveyor against the action of said yielding means, and means to relatively separate the transfer roll and platen during feeding of the work blank therebetween and to bring the transfer roll and platen into printing association with the blank by relative movement of the transfer roll and platen toward each other consequent upon operation of said aligning means.

ARVID PEARSON.
JOSEPH D. KREIS.